US010972581B2

(12) United States Patent
Kuang et al.

(10) Patent No.: US 10,972,581 B2
(45) Date of Patent: Apr. 6, 2021

(54) MEDIA PROCESSING METHOD AND DEVICE

(71) Applicant: Huawei Technologies Co., Ltd., Shenzhen (CN)

(72) Inventors: Yunsheng Kuang, Shenzhen (CN); Yu Zhu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 480 days.

(21) Appl. No.: 15/315,317

(22) PCT Filed: May 29, 2015

(86) PCT No.: PCT/CN2015/080311
§ 371 (c)(1),
(2) Date: Nov. 30, 2016

(87) PCT Pub. No.: WO2015/180688
PCT Pub. Date: Dec. 3, 2015

(65) Prior Publication Data
US 2017/0223139 A1 Aug. 3, 2017

(30) Foreign Application Priority Data

May 30, 2014 (CN) .......................... 201410238320.0

(51) Int. Cl.
*H04L 29/08* (2006.01)
*H04L 12/28* (2006.01)
*H04L 29/06* (2006.01)

(52) U.S. Cl.
CPC ........ *H04L 67/327* (2013.01); *H04L 12/2812* (2013.01); *H04L 65/4069* (2013.01);
(Continued)

(58) Field of Classification Search
CPC .............. H04L 67/327; H04L 12/2812; H04L 65/4069; H04L 65/4084; H04L 65/605; H04L 67/303
(Continued)

(56) References Cited

U.S. PATENT DOCUMENTS 8,266,115 B1 * 9/2012 Park ...................... G06F 16/951
707/692
8,280,863 B2 * 10/2012 Pantos ............... H04N 7/17318
707/693
(Continued)

FOREIGN PATENT DOCUMENTS

CN 1910578 A 2/2007
CN 102714600 A 10/2012
CN 103493500 A 1/2014

*Primary Examiner* — Madhu Woolcock
(74) *Attorney, Agent, or Firm* — Slater Matsil, LLP

(57) ABSTRACT

A method includes acquiring a media content directory on at least one media server, and identifying media description information in at least two media resource objects in the media content directory and integrating the at least two media resource objects when media resources respectively corresponding to the at least two media resource objects have same media content, so the integrated at least two media resource objects are represented by one media identifier. The method also includes sending, according to capability information of a media playback device selected by a user, a media resource address corresponding to a first media resource object to the media playback device, so the media playback device acquires and plays a media resource corresponding to the media resource address, where the first media resource object is one of the at least two media resource objects that are suitable to be played on the media playback device.

16 Claims, 11 Drawing Sheets

(52) U.S. Cl.
CPC ........ *H04L 65/4084* (2013.01); *H04L 65/605* (2013.01); *H04L 67/303* (2013.01)

(58) Field of Classification Search
USPC ........................................................ 709/217
See application file for complete search history.

(56) References Cited

U.S. PATENT DOCUMENTS

| | | | |
|---|---|---|---|
| 8,874,650 B2* | 10/2014 | Svendsen | G06Q 10/10 709/204 |
| 9,143,545 B1* | 9/2015 | Barraclough | H04L 67/025 |
| 9,208,239 B2* | 12/2015 | Amidon | G06F 16/9537 |
| 9,710,944 B2* | 7/2017 | Hall | G06T 11/60 |
| 2003/0074351 A1* | 4/2003 | van Stegeren | G06F 16/93 |
| 2004/0078812 A1* | 4/2004 | Calvert | H04N 21/443 725/46 |
| 2005/0091337 A1* | 4/2005 | Reasor | H04L 63/102 709/217 |
| 2006/0045476 A1* | 3/2006 | Lee | G11B 27/034 386/241 |
| 2006/0080356 A1* | 4/2006 | Burges | G06F 16/40 |
| 2006/0168126 A1* | 7/2006 | Costa-Requena | H04L 12/2803 709/219 |
| 2006/0242259 A1* | 10/2006 | Vallabh | H04N 7/17318 709/217 |
| 2007/0016586 A1* | 1/2007 | Samji | G06F 16/168 |
| 2007/0027957 A1* | 2/2007 | Peters | G11B 27/105 709/217 |
| 2007/0204311 A1* | 8/2007 | Hasek | H04N 7/17318 725/91 |
| 2007/0219953 A1 | 9/2007 | Mak | |
| 2008/0162665 A1* | 7/2008 | Kali | G11B 27/034 709/217 |
| 2009/0187951 A1* | 7/2009 | McCarthy | H04N 5/76 725/58 |
| 2009/0204989 A1* | 8/2009 | White | H04N 21/440263 725/37 |
| 2009/0271398 A1* | 10/2009 | Scherf | G11B 27/11 |
| 2009/0287652 A1 | 11/2009 | Chen et al. | |
| 2010/0094934 A1* | 4/2010 | Svendsen | H04L 29/08729 709/204 |
| 2010/0125907 A1 | 5/2010 | Jonsson | |
| 2011/0167061 A1* | 7/2011 | Li | G06F 16/50 707/728 |
| 2011/0185048 A1* | 7/2011 | Yew | H04M 1/72527 709/221 |
| 2012/0054664 A1* | 3/2012 | Dougall | H04L 65/80 715/772 |
| 2012/0096492 A1* | 4/2012 | Urban | H04N 21/4402 725/39 |
| 2012/0233640 A1* | 9/2012 | Odryna | H04N 21/4622 725/45 |
| 2012/0278837 A1* | 11/2012 | Curtis | H04N 21/4828 725/42 |
| 2012/0278844 A1* | 11/2012 | Curtis | H04N 21/4147 725/93 |
| 2012/0317262 A1 | 12/2012 | Kim et al. | |
| 2012/0324362 A1 | 12/2012 | Jung et al. | |
| 2014/0130092 A1* | 5/2014 | Kunisetty | H04N 21/4828 725/40 |
| 2014/0143212 A1* | 5/2014 | Shumay | G06F 16/437 707/692 |
| 2014/0157314 A1* | 6/2014 | Roberts | H04L 67/10 725/40 |
| 2015/0256861 A1* | 9/2015 | Oyman | H04N 21/25833 725/62 |

* cited by examiner

MEDIA PROCESSING METHOD AND DEVICE

CROSS-REFERENCE TO RELATED APPLICATIONS

This application is a national stage of International Application No. PCT/CN2015/080311, filed on May 29, 2015, which claims priority to Chinese Patent Application No. 201410238320.0, filed on May 30, 2014. Both of the aforementioned applications are hereby incorporated by reference in their entireties.

TECHNICAL FIELD

The present invention relates to multimedia communications technologies, and in particular, to a media processing method and a device.

BACKGROUND

With development of digital home technologies and widespread digitalization of consumer electronics, digitalized entertainment devices and home appliance products are increasingly occurring in families, and also become increasingly rich in variety, and media format types suitable to be used by various devices are also diverse.

Differences exist between device capabilities and supported media format models of various products in a home area network; therefore, some media files cannot be played on all playback devices, and a series of problems in an aspect of media interoperations is caused. Generally, one original media file is extended, by transcoding or in a manner of downloading from different content providers, to obtain multiple media files that have different media formats and/or resolution but represent same content, so that the media content can be played on different media playback devices in the home area network.

In an existing technical solution, discrete media content directories that are obtained by transcoding or downloading and stored on media servers are aggregated and integrated into one total content directory. For media files that have different media formats but same content, a problem of how to perform integration processing on the media files that have same media content is not considered. Therefore, although the content directories are aggregated into one content directory, multiple media files whose titles are the same or similar may occur in the content directory.

SUMMARY

The present invention provides a media processing method and a device, which are used to resolve a problem in the prior art that a total content directory is aggregated for media files, and multiple media files that have a same title occur in the content directory.

According to a first aspect, an embodiment of the present invention provides a media processing method, including acquiring a media content directory on at least one media server, and identifying media description information in at least two media resource objects in the media content directory and integrating the at least two media resource objects when media resources respectively corresponding to the at least two media resource objects have same media content, so that the integrated at least two media resource objects are represented by one media identifier. The method also includes sending, according to capability information of a media playback device selected by a user, a media resource address corresponding to a first media resource object to the media playback device, so that the media playback device acquires and plays a media resource corresponding to the media resource address, where the first media resource object is one of the at least two media resource objects that are suitable to be played on the media playback device.

With reference to the first aspect, in a first possible implementation manner of the first aspect, the identifying media description information in at least two media resource objects in the media content directory includes: performing matching on at least one of a media title, duration, and film information that are in media description information in each media resource object, to determine whether at least two media resources that have same media content exist.

With reference to the first aspect, in a second possible implementation manner of the first aspect, the acquiring a media content directory on at least one media server, and identifying media description information in at least two media resource objects in the media content directory includes: acquiring an integrated media content directory sent by the at least one media server, and when a quantity of media servers is greater than or equal to two, identifying media description information in at least two media resource objects that are in the integrated media content directory and belong to different media servers.

With reference to the second possible implementation manner of the first aspect, in a third possible implementation manner of the first aspect, the identifying media description information in at least two media resource objects that are in the integrated media content directory and belong to different media servers includes: in the at least two media resource objects that are in the integrated media content directory and belong to the different media servers, performing matching on at least one of a media title, duration, and film information that are in media description information in each media resource object, to determine whether at least two media resources that have same media content exist.

With reference to the first possible implementation manner of the first aspect or the third possible implementation manner of the first aspect, in a fourth possible implementation manner of the first aspect, the performing matching on at least one of a media title, duration, and film information that are in media description information in each media resource object, to determine whether at least two media resources that have same media content exist includes: when one of the following conditions is met, determining that the at least two media resources have same media content; or when two of the following conditions are met, determining that the at least two media resources have same media content; or when three of the following conditions are met, determining that the at least two media resources have same media content: media titles in media description information corresponding to at least two media resources include a proportion of characters that are the same, where the proportion exceeds a first threshold; a duration deviation in the media description information corresponding to the at least two media resources falls within a preset range; and film information in the media description information corresponding to the at least two media resources is the same.

With reference to the first aspect and any one of the first to the fourth possible implementation manners of the first aspect, in a fifth possible implementation manner of the first aspect, the integrating the at least two media resource objects when media resources respectively corresponding to the at least two media resource objects have same media content, so that the integrated at least two media resource objects are represented by one media identifier includes: when the media resources respectively corresponding to the at least two media resource objects have same media content, marking each media resource object of the at least two media resource objects, where the marking is adding, to each media resource object of the at least two media resource objects, an identification number and address information that are of another media resource object of the at least two media resource objects, and the marked at least two media resource objects are represented by one media identifier; or when the media resources respectively corresponding to the at least two media resource objects have same media content, combining the at least two media resource objects to generate a reference media resource object, where the reference media resource object includes the media description information in each media resource object of the at least two media resource objects, and the at least two media resource objects are represented by a media identifier of the reference media resource object.

With reference to the first aspect and any one of the first to the fifth possible implementation manners of the first aspect, in a sixth possible implementation manner of the first aspect, before the sending, according to capability information of a media playback device selected by a user, a media resource address corresponding to a first media resource object to the media playback device, the method further includes: performing matching between each of the at least two media resource objects and playback capability information of each of at least one media playback device, and determining a media playback device that supports playback of media resources corresponding to all media resource objects in the at least two media resource objects.

With reference to the sixth possible implementation manner of the first aspect, in a seventh possible implementation manner of the first aspect, the performing matching between each of the at least two media resource objects and playback capability information of each of at least one media playback device includes: performing matching between a media format and resolution that are of each of the at least two media resource objects and a media format for which decoding is supported and display resolution that are in the device capability information of each of the at least one media playback device; or sending a media data request message to the at least one media playback device, so that the at least one media playback device prefetches, according to the media data request message, at least a part of media resource data from the media server for a playback attempt.

With reference to the seventh possible implementation manner of the first aspect, in an eighth possible implementation manner of the first aspect, the media data request message includes: a storage path of the media resources and a range of to-be-prefetched data.

With reference to the first aspect and any one of the first to the eighth possible implementation manners of the first aspect, in a ninth possible implementation manner of the first aspect, the sending, according to capability information of a media playback device selected by a user, a media resource address corresponding to a first media resource object to the media playback device, so that the media playback device acquires and plays a media resource corresponding to the media resource address, where the first media resource object is one of the at least two media resource objects that are suitable to be played on the media playback device includes: receiving a playback request of the user, where the playback request includes the media playback device selected from the at least one media playback device and a requested media identifier; determining the first media resource object if the requested media identifier is the media identifier corresponding to the at least two media resources that have same media content, where the first media resource object is a media resource that is in the at least two media resources and whose playback is supported by the selected media playback device; and sending a playback command to the selected media playback device, where the playback command carries the media resource address corresponding to the first media resource object, so that the selected media playback device plays the media resource whose playback is supported.

With reference to any one of the sixth to the ninth possible implementation manners of the first aspect, in a tenth possible implementation manner of the first aspect, the determining a media playback device that supports playback of media resources corresponding to all media resource objects in the at least two media resource objects includes: if a quantity of media resources that are in the at least two media resource objects and whose playback is supported by a media playback device is greater than one, determining, according to resolution of the more than one media resource and device capability information of the media playback device, a playback priority that is of the more than one media resource and relative to the media playback device; or if a quantity of media resources that are in the at least two media resource objects and whose playback is supported by a media playback device is greater than one, determining, according to a playback response delay effect of the more than one media resource, a playback priority that is of the more than one media resource and relative to the media playback device; and the determining a media resource that is in the at least two media resources and whose playback is supported by the selected media playback device includes: determining a media resource that is in the at least two media resource objects, whose playback is supported by the selected media playback device, and that has a highest playback priority; where the playback command carries a media resource address of the media resource whose playback is supported by the selected media playback device and that has the highest playback priority.

With reference to the ninth or the tenth possible implementation manner of the first aspect, in an eleventh possible implementation manner of the first aspect, after the sending a playback command to the selected media playback device, the method further includes: receiving a switch request of the user, where the switch request includes identification numbers of a to-be-switched-to media playback device and a to-be-switched-to media resource; if the to-be-switched-to media resource is one of the at least two media resources that have same media content, and the to-be-switched-to media playback device does not support playback of the to-be-switched-to media resource, determining a media resource that is in the at least two media resources and whose playback is supported by the to-be-switched-to media playback device; and sending a playback command to the to-be-switched-to media playback device, where the playback command carries a media resource address of the media resource whose playback is supported by the to-be-switched-to media playback device, so that the to-be-switched-to media playback device plays the media resource whose playback is supported.

With reference to the eleventh possible implementation manner of the first aspect, in a twelfth possible implementation manner of the first aspect, the switch request further includes a current playback moment; and the sending a playback command to the to-be-switched-to media playback device includes: if duration of the media resource that is in the at least two media resources and whose playback is supported by the to-be-switched-to media playback device is the same as duration of the to-be-switched-to media resource, sending the playback command to the to-be-switched-to media playback device, where the playback command further includes the current playback moment, so that the to-be-switched-to media playback device starts, from the current playback moment, to play the media resource whose playback is supported; where switching fails if the duration of the media resource that is in the at least two media resources and whose playback is supported by the to-be-switched-to media playback device is different from the duration of the to-be-switched-to media resource.

With reference to any one of the sixth to the twelfth possible implementation manners of the first aspect, in a thirteenth possible implementation manner of the first aspect, after the determining a media playback device that supports playback of media resources corresponding to all media resource objects in the at least two media resource objects, the method further includes: generating a match list, where the match list includes an identifier of a media playback device and an identification number of a media resource that is in the at least two media resources and whose playback is supported by the media playback device; and the determining a media resource that is in the at least two media resources and whose playback is supported by the selected media playback device includes: determining, according to the match list, an identification number of the media resource that is in the at least two media resources and whose playback is supported by the selected media playback device.

According to a second aspect, an embodiment of the present invention provides a media processing method, including identifying, by a media server, media description information in at least two media resource objects in a media content directory stored on the media server, and integrating the at least two media resource objects when media resources respectively corresponding to the at least two media resource objects have same media content, so that the integrated at least two media resource objects are represented by one media identifier and sending an integrated media content directory to a media control device. The method also includes receiving a media resource acquisition request sent by a media playback device, where the media resource acquisition request includes a media resource address; and sending a media resource corresponding to the media resource address to the media playback device.

With reference to the second aspect, in a first possible implementation manner of the second aspect, the identifying media description information in at least two media resource objects in a media content directory stored on the media server includes: performing matching on at least one of a media title, duration, and film information that are in media description information in each media resource object, to determine whether at least two media resources that have same media content exist.

With reference to the first possible implementation manner of the second aspect, in a second possible implementation manner of the second aspect, the performing matching on at least one of a media title, duration, and film information that are in media description information in each media resource object, to determine whether at least two media resources that have same media content exist includes: when one of the following conditions is met, determining that the at least two media resources have same media content; or when two of the following conditions are met, determining that the at least two media resources have same media content; or when three of the following conditions are met, determining that the at least two media resources have same media content: media titles in media description information corresponding to at least two media resources include a proportion of characters that are the same, where the proportion exceeds a first threshold; a duration deviation in the media description information corresponding to the at least two media resources falls within a preset range; and film information in the media description information corresponding to the at least two media resources is the same.

With reference to the second aspect and either of the first and the second possible implementation manners of the second aspect, in a third possible implementation manner of the second aspect, the integrating the at least two media resource objects when media resources respectively corresponding to the at least two media resource objects have same media content, so that the integrated at least two media resource objects are represented by one media identifier includes: when the media resources respectively corresponding to the at least two media resource objects have same media content, marking each media resource object of the at least two media resource objects, where the marking is adding, to each media resource object of the at least two media resource objects, an identification number and address information that are of another media resource object of the at least two media resource objects, and the marked at least two media resource objects are represented by one media identifier; or when the media resources respectively corresponding to the at least two media resource objects have same media content, combining the at least two media resource objects to generate a reference media resource object, where the reference media resource object includes the media description information in each media resource object of the at least two media resource objects, and the at least two media resource objects are represented by a media identifier of the reference media resource object.

According to a third aspect, an embodiment of the present invention provides a media control device, including: an acquiring module, configured to: acquire a media content directory on at least one media server, and identify media description information in at least two media resource objects in the media content directory; a processing module, configured to integrate the at least two media resource objects when media resources respectively corresponding to the at least two media resource objects have same media content, so that the integrated at least two media resource objects are represented by one media identifier; and a pushing module, configured to send, according to capability information of a media playback device selected by a user, a media resource address corresponding to a first media resource object to the media playback device, so that the media playback device acquires and plays a media resource corresponding to the media resource address, where the first media resource object is one of the at least two media resource objects that are suitable to be played on the media playback device.

With reference to the third aspect, in a first possible implementation manner of the third aspect, the acquiring module includes a match unit, configured to perform matching on at least one of a media title, duration, and film information that are in media description information in each media resource object, to determine whether at least two media resources that have same media content exist.

With reference to the third aspect, in a second possible implementation manner of the third aspect, the acquiring module is specifically configured to: acquire an integrated media content directory sent by the at least one media server, and when a quantity of media servers is greater than or equal to two, identify media description information in at least two media resource objects that are in the integrated media content directory and belong to different media servers.

With reference to the second possible implementation manner of the third aspect, in a third possible implementation manner of the third aspect, the match unit is specifically configured to: in the at least two media resource objects that are in the integrated media content directory and belong to the different media servers, perform matching on at least one of a media title, duration, and film information that are in media description information in each media resource object, to determine whether at least two media resources that have same media content exist.

With reference to the first possible implementation manner of the third aspect or the third possible implementation manner of the third aspect, in a fourth possible implementation manner of the third aspect, the performing matching on at least one of a media title, duration, and film information that are in media description information in each media resource object, to determine whether at least two media resources that have same media content exist includes: when one of the following conditions is met, determining that the at least two media resources have same media content; or when two of the following conditions are met, determining that the at least two media resources have same media content; or when three of the following conditions are met, determining that the at least two media resources have same media content: media titles in media description information corresponding to at least two media resources include a proportion of characters that are the same, where the proportion exceeds a first threshold; a duration deviation in the media description information corresponding to the at least two media resources falls within a preset range; and film information in the media description information corresponding to the at least two media resources is the same.

With reference to the third aspect and any one of the first to the fourth possible implementation manners of the third aspect, in a fifth possible implementation manner of the third aspect, the processing module further includes an integration unit, configured to: when the media resources respectively corresponding to the at least two media resource objects have same media content, mark each media resource object of the at least two media resource objects, where the marking is adding, to each media resource object of the at least two media resource objects, an identification number and address information that are of another media resource object of the at least two media resource objects, and the marked at least two media resource objects are represented by one media identifier; or when the media resources respectively corresponding to the at least two media resource objects have same media content, combine the at least two media resource objects to generate a reference media resource object, where the reference media resource object includes the media description information in each media resource object of the at least two media resource objects, and the at least two media resource objects are represented by a media identifier of the reference media resource object.

With reference to the third aspect and any one of the first to the fifth possible implementation manners of the third aspect, in a sixth possible implementation manner of the third aspect, the media control device further includes a playback match module, configured to: perform matching between each of the at least two media resource objects and playback capability information of each of at least one media playback device, and determine a media playback device that supports playback of media resources corresponding to all media resource objects in the at least two media resource objects.

With reference to the sixth possible implementation manner of the third aspect, in a seventh possible implementation manner of the third aspect, the playback match module is specifically configured to: perform matching between a media format and resolution that are of each of the at least two media resource objects and a media format for which decoding is supported and display resolution that are in the device capability information of each of the at least one media playback device; or send a media data request message to the at least one media playback device, so that the at least one media playback device prefetches, according to the media data request message, at least a part of media resource data from the media server for a playback attempt.

With reference to the seventh possible implementation manner of the third aspect, in an eighth possible implementation manner of the third aspect, the media data request message includes: a storage path of the media resources and a range of to-be-prefetched data.

With reference to the third aspect and any one of the first to the eighth possible implementation manners of the third aspect, in a ninth possible implementation manner, the pushing module includes: a receiving unit, configured to receive a playback request of the user, where the playback request includes the media playback device selected from the at least one media playback device and a requested media identifier; a determining unit, determining the first media resource object if the requested media identifier is the media identifier corresponding to the at least two media resources that have same media content, where the first media resource object is a media resource that is in the at least two media resources and whose playback is supported by the selected media playback device; and a sending unit, configured to send a playback command to the selected media playback device, where the playback command carries the media resource address corresponding to the first media resource object, so that the selected media playback device plays the media resource whose playback is supported.

With reference to the ninth possible implementation manner of the third aspect, in a tenth possible implementation manner of the third aspect, the playback match module is specifically configured to: if a quantity of media resources that are in the at least two media resource objects and whose playback is supported by a media playback device is greater than one, determine, according to resolution of the more than one media resource and device capability information of the media playback device, a playback priority that is of the more than one media resource and relative to the media playback device; or if a quantity of media resources that are in the at least two media resource objects and whose playback is supported by a media playback device is greater than one, determine, according to a playback response delay effect of the more than one media resource, a playback priority that is of the more than one media resource and relative to the media playback device; and the determining unit is specifically configured to: determine a media resource that is in the at least two media resource objects, whose playback is supported by the selected media playback device, and that has a highest playback priority; where the playback command carries a media resource address of the media resource whose playback is supported by the selected media playback device and that has the highest playback priority.

With reference to the ninth or the tenth possible implementation manner of the third aspect, in an eleventh possible implementation manner of the third aspect, the apparatus further includes a switch module, configured to: receive a switch request of the user, where the switch request includes identification numbers of a to-be-switched-to media playback device and a to-be-switched-to media resource; if the to-be-switched-to media resource is one of the at least two media resources that have same media content, and the to-be-switched-to media playback device does not support playback of the to-be-switched-to media resource, determine a media resource that is in the at least two media resources and whose playback is supported by the to-be-switched-to media playback device; and send a playback command to the to-be-switched-to media playback device, where the playback command carries a media resource address of the media resource whose playback is supported by the to-be-switched-to media playback device, so that the to-be-switched-to media playback device plays the media resource whose playback is supported.

With reference to the eleventh possible implementation manner of the third aspect, in a twelfth possible implementation manner of the third aspect, the switch request further includes a current playback moment; and the sending a playback command to the to-be-switched-to media playback device includes: if duration of the media resource that is in the at least two media resources and whose playback is supported by the to-be-switched-to media playback device is the same as duration of the to-be-switched-to media resource, sending the playback command to the to-be-switched-to media playback device, where the playback command further includes the current playback moment, so that the to-be-switched-to media playback device starts, from the current playback moment, to play the media resource whose playback is supported; where switching fails if the duration of the media resource that is in the at least two media resources and whose playback is supported by the to-be-switched-to media playback device is different from the duration of the to-be-switched-to media resource.

With reference to any one of the sixth to the twelfth possible implementation manners of the third aspect, in a thirteenth possible implementation manner of the third aspect, the apparatus further includes a generation module, configured to generate a match list, where the match list includes an identifier of a media playback device and an identification number of a media resource that is in the at least two media resources and whose playback is supported by the media playback device; and the determining unit is specifically configured to: determine, according to the match list, an identification number of the media resource that is in the at least two media resources and whose playback is supported by the selected media playback device.

According to a fourth aspect, an embodiment of the present invention provides a media server, including: a processing module, configured to: identify media description information in at least two media resource objects in a media content directory stored in the processing module, and integrate the at least two media resource objects when media resources respectively corresponding to the at least two media resource objects have same media content, so that the integrated at least two media resource objects are represented by one media identifier; a sending module, configured to send an integrated media content directory to a media control device; and a receiving module, configured to: receive a media resource acquisition request sent by a media playback device, where the media resource acquisition request includes a media resource address; and send a media resource corresponding to the media resource address to the media playback device.

With reference to the fourth aspect, in a first possible implementation manner of the fourth aspect, the processing module includes a match unit, configured to perform matching on at least one of a media title, duration, and film information that are in media description information in each media resource object, to determine whether at least two media resources that have same media content exist.

With reference to the first possible implementation manner of the fourth aspect, in a second possible implementation manner of the fourth aspect, the match module is specifically configured to: when one of the following conditions is met, determine that the at least two media resources have same media content; or when two of the following conditions are met, determine that the at least two media resources have same media content; or when three of the following conditions are met, determine that the at least two media resources have same media content: media titles in media description information corresponding to at least two media resources include a proportion of characters that are the same, where the proportion exceeds a first threshold; a duration deviation in the media description information corresponding to the at least two media resources falls within a preset range; and film information in the media description information corresponding to the at least two media resources is the same.

With reference to the fourth aspect and either of the first and the second possible implementation manners of the fourth aspect, in a third possible implementation manner of the fourth aspect, the processing module is specifically configured to: when the media resources respectively corresponding to the at least two media resource objects have same media content, mark each media resource object of the at least two media resource objects, where the marking is adding, to each media resource object of the at least two media resource objects, an identification number and address information that are of another media resource object of the at least two media resource objects, and the marked at least two media resource objects are represented by one media identifier; or when the media resources respectively corresponding to the at least two media resource objects have same media content, combine the at least two media resource objects to generate a reference media resource object, where the reference media resource object includes the media description information in each media resource object of the at least two media resource objects, and the at least two media resource objects are represented by a media identifier of the reference media resource object.

According to the media processing method and the device in the embodiments of the present invention, a media content directory on at least one media server is acquired; media description information in at least two media resource objects in the media content directory is identified; the at least two media resource objects are integrated when media resources respectively corresponding to the at least two media resource objects have same media content; and a content list is obtained according to an integrated media content directory, so that the media resource objects that have same media content are represented by only one media identifier. Therefore, the content list to be presented to a user does not include same media identifiers. Then, in a playback process, a media resource address corresponding to a media resource object of the at least two media resource objects suitable to be played on a media playback device selected by the user is sent to the media playback device according to capability information of the media playback device, so that the media playback device acquires and plays a media resource corresponding to the media resource address. Therefore, a media identifier in a content list to be presented to a user is unique, and in a playback process, media resources that are suitable to be played on different media playback devices are pushed to the different media playback devices.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

A media server involved in the embodiments of the present invention may include a digital media server (DMS), and is used to store media files such as a picture, audio, and a video. The DMS may be a home area network device or a mobile handheld device that can generate and store media content such as a picture, music, and a video program, for example, a smartphone, a tablet computer, a digital camera, or a portable computer, or may be a media server that is located outside a home area network and on a network side and that can be discovered, controlled, and accessed by an internal control point in the home area network, for example, a cloud server that accesses an account with the help of a user.

A media playback device involved in the embodiments of the present invention may include a digital media renderer (DMR) and a digital media player (DMP), and is a device used to play media files such as a picture, audio, and a video. The DMR may be a fixed playback device such as acoustic equipment, a television set, a set-top box connected to a television set, or a projector, or may be a mobile playback device such as a smartphone, a tablet computer, a portable computer, or a personal digital terminal.

A media control device involved in the embodiments of the present invention is a device used to discover an online media server and an online media playback device in a home area network and control the devices. The media control device may be a digital media controller (DMC), for example, may be a mobile handheld device such as a smartphone or a tablet computer.

An aggregation module (AO) involved in the embodiments of the present invention is a functional module used to aggregate content directories stored on DMSs in and outside a home area network, and the functional module may be built into a DMS or a DMC, or may be an independent physical device.

Figure 1:
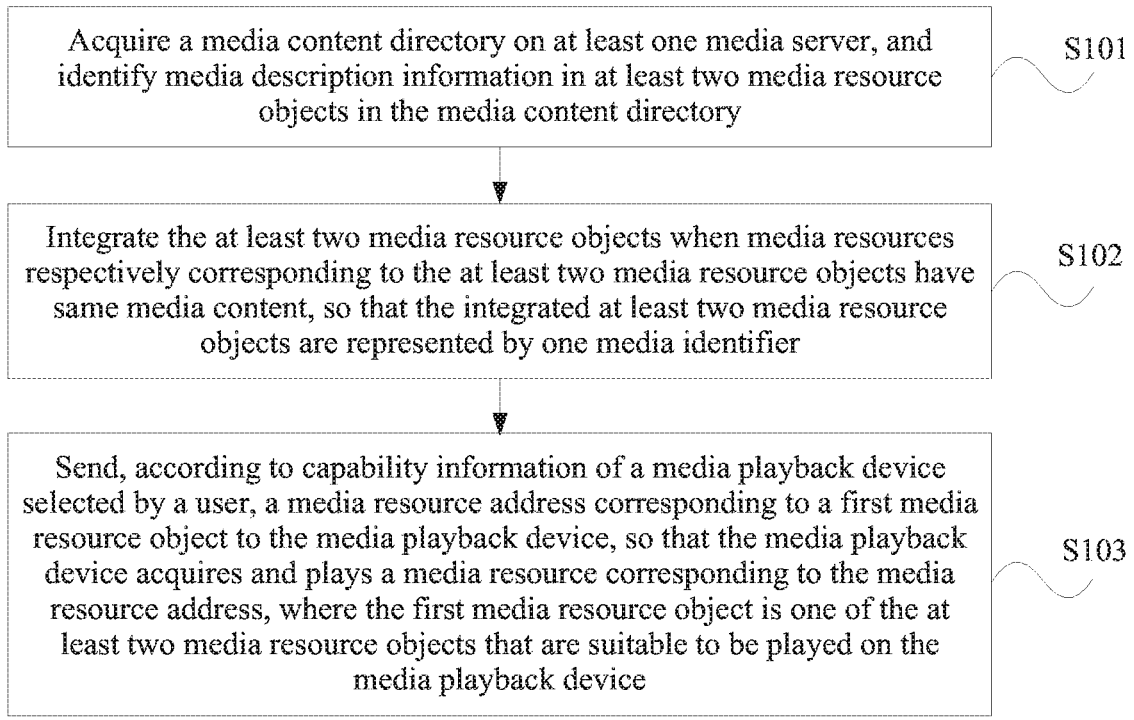
FIG. 1 is a flowchart of Embodiment 1 of a media processing method according to the present invention.

FIG. 1 is a flowchart of Embodiment 1 of a media processing method according to the present invention. This embodiment is executed by a media control device. As shown in FIG. 1, the method in this embodiment may include the following steps.

S101: Acquire a media content directory on at least one media server, and identify media description information in at least two media resource objects in the media content directory.

The media content directory includes multiple media resource objects, the media resource object is in a one-to-one correspondence with a media resource, the media resource object includes media description information of the media resource corresponding to the media resource object, and the media description information may include but is not limited to a media title, duration, film information, and the like.

S102: Integrate the at least two media resource objects when media resources respectively corresponding to the at least two media resource objects have same media content, so that the integrated at least two media resource objects are represented by one media identifier.

That media resources have same media content is specifically that different media resources have same media content (such as media files of a same movie and of different versions). Media resources that meet this condition may specifically include: different media resources that have same media content and a same media format, or media resources that have same media content and different versions or formats, for example, same movies that have different resolution, quality, or bit rates. For example, if three media files are respectively avater.rmvb, avater.avi, and avater.wmv, where the three media files have same content, that is, the three media files are all a movie avater, but formats of the three media files are different, the three media files are different media resources that have same media content.

After the media resource objects that have same media content are integrated in step S102, a content list is obtained according to an integrated media content directory. The media resource objects that have same media content are represented by only one media identifier; therefore, the content list to be presented to a user does not include same media identifiers. The content list includes media identifiers that are stored on the at least one media server and of media resources that have different media content and the media identifier that is stored on the at least one media server and of the media resources that have same media content.

S103: Send, according to capability information of a media playback device selected by a user, a media resource address corresponding to a first media resource object to the media playback device, so that the media playback device acquires and plays a media resource corresponding to the media resource address, where the first media resource object is one of the at least two media resource objects that are suitable to be played on the media playback device.

Optionally, the identifying media description information in at least two media resource objects in the media content directory in step S102 may be specifically: performing matching on at least one of a media title, duration, and film information that are in media description information in each media resource object, to determine whether at least two media resources that have same media content exist, where the film information may include publisher information and director information.

The performing matching on at least one of a media title, duration, and film information that are in the media description information, to determine whether at least two media resources that have same media content exist may be specifically: if any condition or any two conditions or three conditions in the following conditions (1), (2), and (3) is or are met, it may be determined that at least two media resources have same media content: (1) media titles in media description information corresponding to at least two media resources include a proportion of characters that are the same, where the proportion exceeds a first threshold; (2) a duration deviation in the media description information corresponding to the at least two media resources falls within a preset range; and (3) film information in the media description information corresponding to the at least two media resources is the same.

In the foregoing process of determining whether at least two media resources that have same media content exist, one preferable manner may be: if media titles in media description information corresponding to at least two media resources include a proportion of characters that are the same, where the proportion exceeds the first threshold, determining whether a duration deviation in the media description information corresponding to the at least two media resources falls within the preset range; if the duration deviation in the media description information corresponding to the at least two media resources falls within the preset range, determining whether film information in the media description information corresponding to the at least two media resources is the same; and if the film information in the media description information corresponding to the at least two media resources is the same, determining that the at least two media resources have same media content.

For example, the foregoing first threshold may be a fixed value. When media titles of multiple media files are being compared, a proportion of a quantity of same characters in each media title to a quantity of characters in each media title may be compared with the first threshold, where it only needs to be ensured that main parts or most characters in media titles are the same. For example, the first threshold is set to 0.8. Assuming that media titles of two media files are respectively "avater" and "avaterr", same characters in both media titles are "avater", a quantity of same characters is 6, a proportion of the quantity of same characters in the media title "avater" is 1, a proportion of the quantity of same characters in the media title "avaterr" is 0.87, and there is a possibility that the two media files have same media content. Then, a duration deviation of the two media files is determined. A difference exists between program duration of media files provided by different content providers; therefore, in an identification process, a deviation within a specific preset range is allowed between duration of media files. For example, generally, total duration of opening credits and closing credits that are of a movie is between one and a half minutes and three minutes, and the time interval may be used as a deviation within a preset range. If the duration of the two media files are respectively one hour and 25 minutes and one hour and 23 minutes, the duration deviation of the two media files "avater" and "avaterr" falls within the preset range. It is further determined whether film information is the same. If for the foregoing two media files, publishers are both 20 Century Fox™, and directors are both James Camron, it is determined that media content of the two media files is the same.

The foregoing manner of performing matching on a media title, duration, and film information that are in media description information in each media resource object is one preferable manner of determining whether at least two media resources that have same media content exist. It may also be: first, determining whether a duration deviation in media description information corresponding to media resources falls within the preset range; then determining whether media titles include a proportion of characters that are the same, where the proportion exceeds the first threshold; and finally, determining whether film information is the same. That is, a sequence for performing determining for the media titles, the duration deviation, and the film information may not be limited.

Specifically, in step S102, the integrating the at least two media resource objects when media resources respectively corresponding to the at least two media resource objects have same media content, so that the integrated at least two media resource objects are represented by one media identifier may be specifically implemented in either of the following two manners: (1) when the media resources respectively corresponding to the at least two media resource objects have same media content, each media resource object of the at least two media resource objects is marked, where the marking is adding, to each media resource object of the at least two media resource objects, an identification number and address information that are of another media resource object of the at least two media resource objects, and the marked at least two media resource objects are represented by one media identifier; (2) when the media resources respectively corresponding to the at least two media resource objects have same media content, the at least two media resource objects are combined to generate a reference media resource object, where the reference media resource object includes the media description information in each media resource object of the at least two media resource objects, and the at least two media resource objects are represented by a media identifier of the reference media resource object.

Optionally, before step S103, the method may further include: performing matching between each of the at least two media resource objects and playback capability information of each of at least one media playback device, and determining a media playback device that supports playback of media resources corresponding to all media resource objects in the at least two media resource objects.

Matching may be performed between each of the at least two media resource objects and playback capability information of each of at least one media playback device in either of the following two manners: (1) matching is performed between a media format and resolution that are of each of the at least two media resource objects and a media format for which decoding is supported and display resolution that are in the device capability information of each of the at least one media playback device; (2) a media data request message is sent to the at least one media playback device, so that the at least one media playback device prefetches, according to the media data request message, at least a part of media resource data from the media server for a playback attempt. In one of the foregoing two manners, the media playback device for playing the media resources corresponding to all the media resource objects in the at least two media resource objects may be determined.

The media data request message may include a storage path of the media resources and a range of to-be-prefetched data.

Optionally, step S103 may be specifically: receiving a playback request of the user, where the playback request includes the media playback device selected from the at least one media playback device and a requested media identifier; determining the first media resource object if the requested media identifier is the media identifier corresponding to the at least two media resources that have same media content, where the first media resource object is a media resource that is in the at least two media resources and whose playback is supported by the selected media playback device; and sending a playback command to the selected media playback device, where the playback command carries the media resource address corresponding to the first media resource object, so that the selected media playback device plays the media resource whose playback is supported.

The determining a media playback device that supports playback of media resources corresponding to all media resource objects in the at least two media resource objects may be specifically: if a quantity of media resources that are in the at least two media resource objects and whose playback is supported by a media playback device is greater than one, determining, according to resolution of the more than one media resource and device capability information of the media playback device, a playback priority that is of the more than one media resource and relative to the media playback device; or determining, according to a playback response delay effect of the more than one media resource, a playback priority that is of the more than one media resource and relative to the media playback device. Then, the determining a media resource that is in the at least two media resources and whose playback is supported by the selected media playback device includes: determining a media resource that is in the at least two media resource objects, whose playback is supported by the selected media playback device, and that has a highest playback priority, where the playback command carries a media resource address of the media resource whose playback is supported by the selected media playback device and that has the highest playback priority.

Optionally, after the sending a playback command to the selected media playback device, a switch request of the user is received, where the switch request includes identification numbers of a to-be-switched-to media playback device and a to-be-switched-to media resource; if the to-be-switched-to media resource is one of the at least two media resources that have same media content, and the to-be-switched-to media playback device does not support playback of the to-be-switched-to media resource, a media resource that is in the at least two media resources and whose playback is supported by the to-be-switched-to media playback device is determined; and a playback command is sent to the to-be-switched-to media playback device, where the playback command carries a media resource address of the media resource whose playback is supported by the to-be-switched-to media playback device, so that the to-be-switched-to media playback device plays the media resource whose playback is supported.

The switch request further includes a current playback moment; and that a playback command is sent to the to-be-switched-to media playback device may be specifically: if duration of the media resource that is in the at least two media resources and whose playback is supported by the to-be-switched-to media playback device is the same as duration of the to-be-switched-to media resource, sending the playback command to the to-be-switched-to media playback device, where the playback command further includes the current playback moment, so that the to-be-switched-to media playback device starts, from the current playback moment, to play the media resource whose playback is supported, where switching fails if the duration of the media resource that is in the at least two media resources and whose playback is supported by the to-be-switched-to media playback device is different from the duration of the to-be-switched-to media resource.

After the determining a media playback device that supports playback of all media resources in the at least two media resources, a match list may be further generated, where the match list includes an identifier of a media playback device and an identification number of a media resource that is in the at least two media resources and whose playback is supported by the media playback device. Correspondingly, the determining a media resource that is in the at least two media resources and whose playback is supported by the selected media playback device may be: determining, according to the match list, an identification number of the media resource that is in the at least two media resources and whose playback is supported by the selected media playback device. That is, the media resource whose playback is supported by the selected media playback device may be directly determined by using the playback priority that is of the more than one media resource and relative to the media playback device; or the match list may be generated according to the playback priority, and then the media resource whose playback is supported by the selected media playback device is determined according to the match list.

According to the media processing method provided in this embodiment, a media content directory on at least one media server is acquired; media description information in at least two media resource objects in the media content directory is identified; the at least two media resource objects are integrated when media resources respectively corresponding to the at least two media resource objects have same media content; and a content list is obtained according to an integrated media content directory, so that the media resource objects that have same media content are represented by only one media identifier. Therefore, the content list to be presented to a user does not include same media identifiers. Then, in a playback process, a media resource address corresponding to a media resource object of the at least two media resource objects suitable to be played on a media playback device selected by the user is sent to the media playback device according to capability information of the media playback device, so that the media playback device acquires and plays a media resource corresponding to the media resource address. Therefore, a media identifier in a content list to be presented to a user is unique, and in a playback process, media resources that are suitable to be played on different media playback devices are pushed to the different media playback devices.

Figure 2:
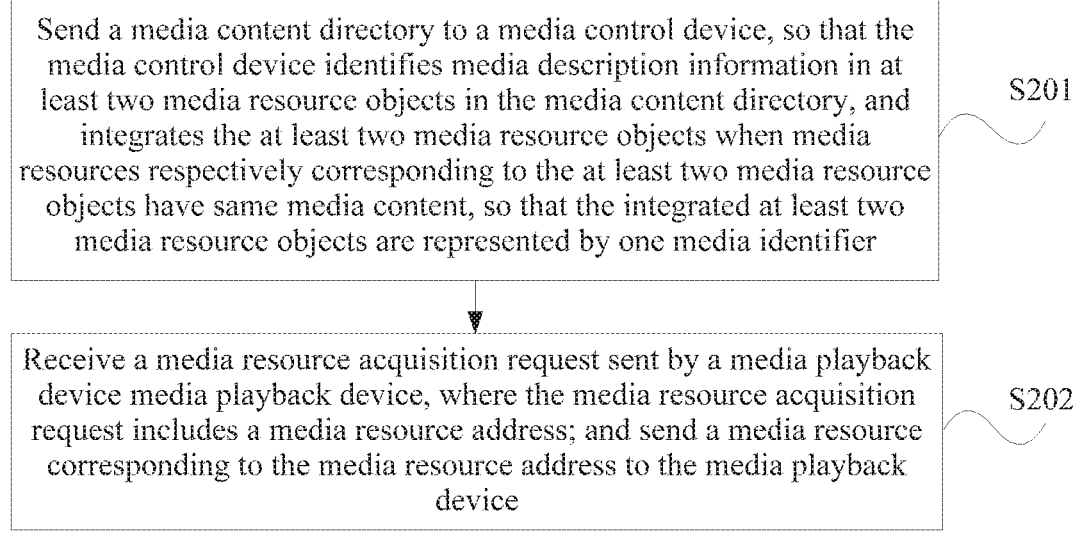
FIG. 2 is a flowchart of Embodiment 2 of a media processing method according to the present invention.

FIG. 2 is a flowchart of Embodiment 2 of a media processing method according to the present invention. This embodiment is executed by a media server. As shown in FIG. 2, the method in this embodiment may include the following steps.

S201: Send a media content directory to a media control device, so that the media control device identifies media description information in at least two media resource objects in the media content directory, and integrates the at least two media resource objects when media resources respectively corresponding to the at least two media resource objects have same media content, so that the integrated at least two media resource objects are represented by one media identifier.

S202: Receive a media resource acquisition request sent by a media playback device media playback device, where the media resource acquisition request includes a media resource address; and send a media resource corresponding to the media resource address to the media playback device.

In step S201, the identifying media description information in at least two media resource objects in the media content directory may be: performing matching on at least one of a media title, duration, and film information that are in the media description information, to determine whether at least two media resources that have same media content exist, where the film information may include publisher information, director information, starring information, and the like.

Specifically, the performing matching on at least one of a media title, duration, and film information that are in the media description information, to determine whether at least two media resources that have same media content exist may be: if any condition or any two conditions or three conditions in the following conditions (1), (2), and (3) is or are met, it may be determined that at least two media resources have same media content: (1) media titles in media description information corresponding to at least two media resources include a proportion of characters that are the same, where the proportion exceeds a first threshold; (2) a duration deviation in the media description information corresponding to the at least two media resources falls within a preset range; and (3) film information in the media description information corresponding to the at least two media resources is the same.

In the foregoing process of determining whether at least two media resources that have same media content exist, one preferable manner may be: if media titles in media descriptions corresponding to at least two media resources include a proportion of characters that are the same, where the proportion exceeds the first threshold, determining whether a duration deviation in media description information corresponding to the at least two media resources falls within the preset range; if the duration deviation in the media description information corresponding to the at least two media resources falls within the preset range, determining whether film information in the media description information corresponding to the at least two media resources is the same; and if the film information in the media description information corresponding to the at least two media resources is the same, determining that the at least two media resources have same media content.

The integrating the at least two media resource objects when media resources respectively corresponding to the at least two media resource objects have same media content, so that the integrated at least two media resource objects are represented by one media identifier may be implemented in either of the following two manners: (1) when the media resources respectively corresponding to the at least two media resource objects have same media content, each media resource object of the at least two media resource objects is marked, where the marking is adding, to each media resource object of the at least two media resource objects, an identification number and address information that are of another media resource object of the at least two media resource objects, and the marked at least two media resource objects are represented by one media identifier; (2) when the media resources respectively corresponding to the at least two media resource objects have same media content, the at least two media resource objects are combined to generate a reference media resource object, where the reference media resource object includes media description information in each media resource object of the at least two media resource objects, and the at least two media resource objects are represented by a media identifier of the reference media resource object.

According to the media processing method provided in this embodiment, a media content directory is sent to a media control device, so that the media control device identifies media description information in at least two media resource objects in the media content directory, and when media resources respectively corresponding to the at least two media resource objects have same media content, integrates the at least two media resource objects, and generates a content list according to an integrated media content directory, so that the integrated at least two media resource objects are represented by one media identifier. A media resource acquisition request sent by a media playback device is received, where the media resource acquisition request includes a media resource address. A media resource corresponding to the media resource address is sent to the media playback device. Therefore, a media identifier in the content list to be presented to a user is unique.

Figure 3A:
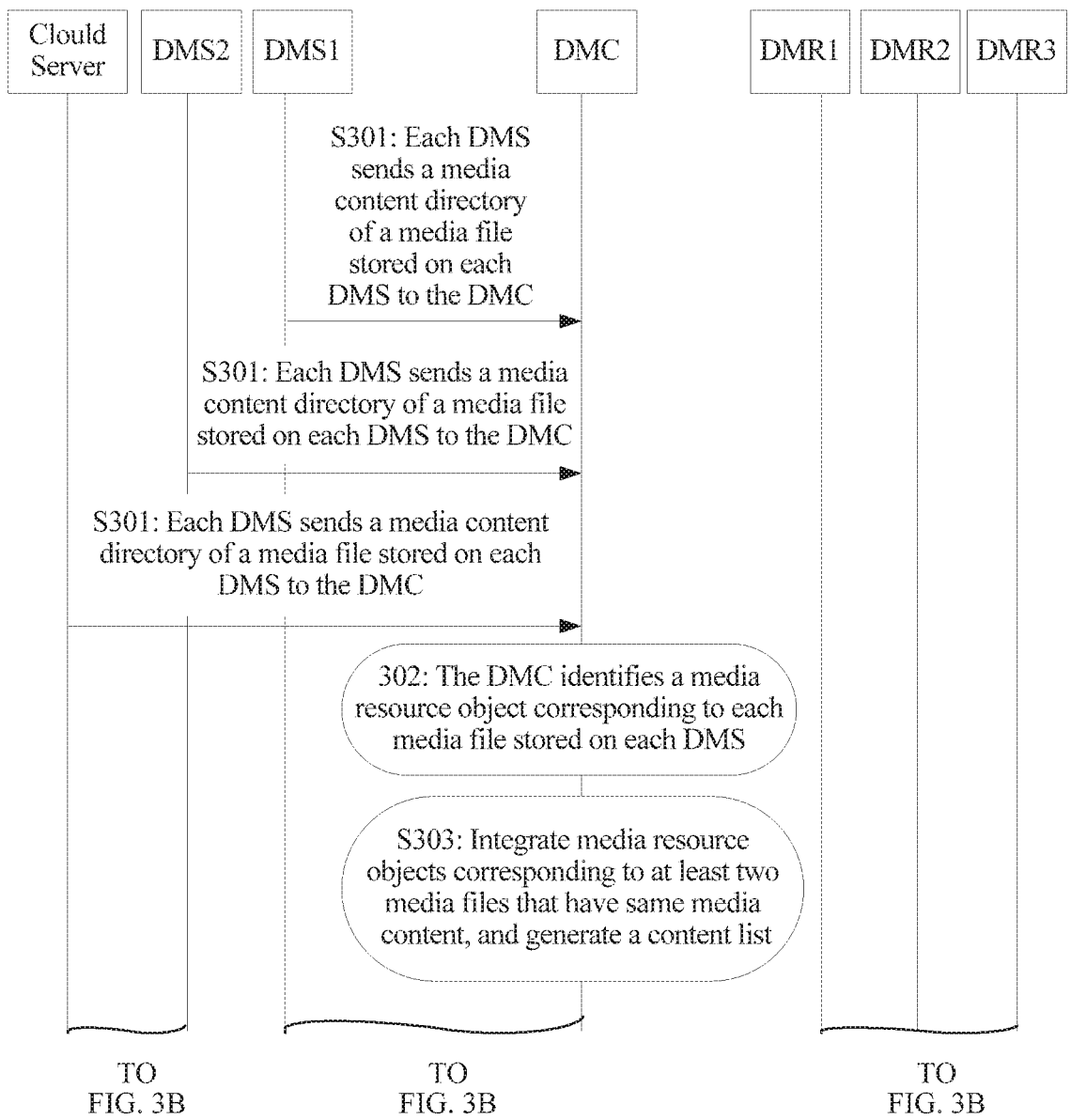
FIG. 3A and FIG. 3B are flowcharts of Embodiment 3 of a media processing method according to the present invention.
Figure 3B:
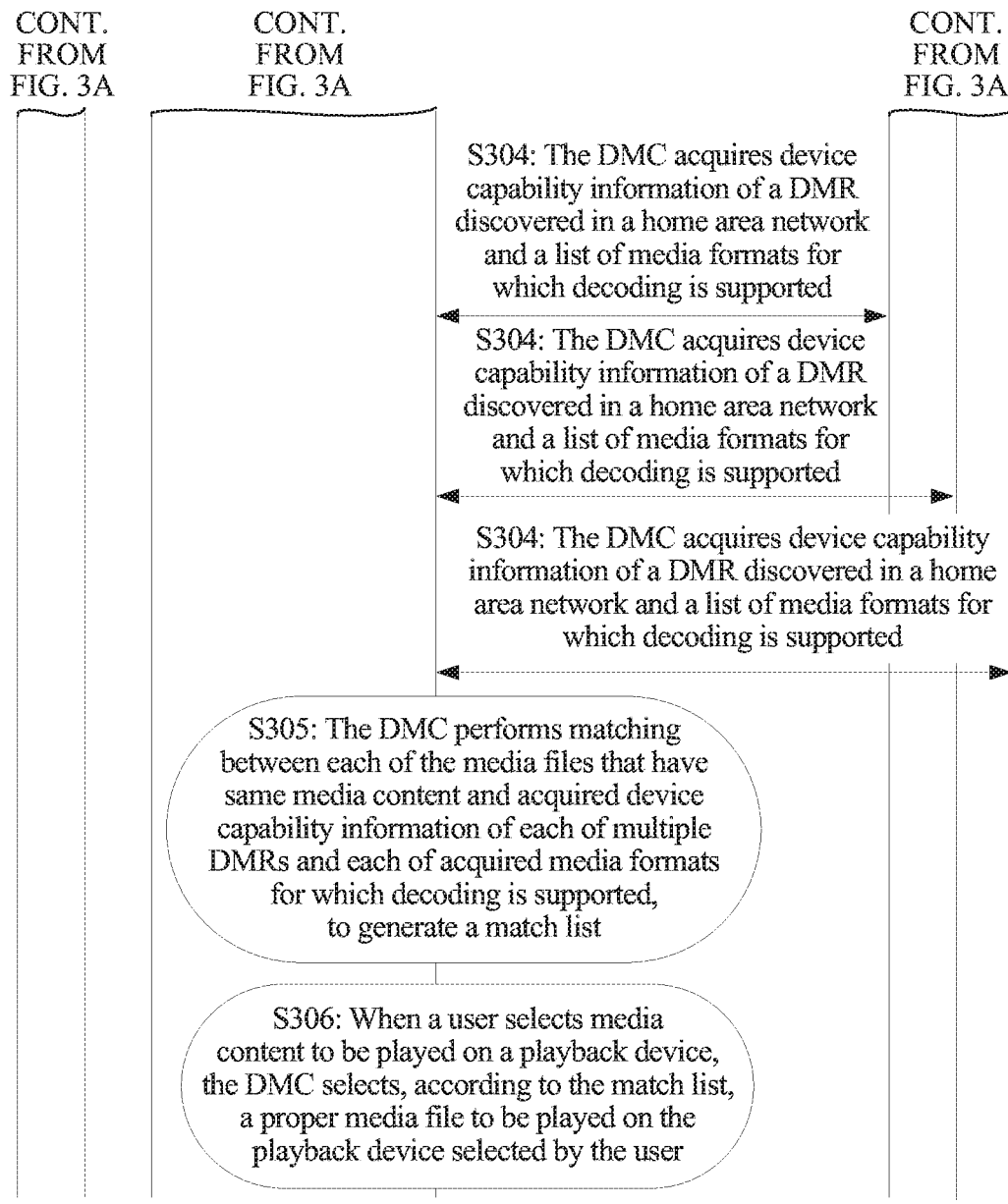

FIG. 3A and FIG. 3B are a flowchart of Embodiment 3 of a media processing method according to the present invention. The following describes in detail, by using a specific embodiment, the methods shown in FIG. 1 and FIG. 2. As shown in FIG. 3A, two DMSs located in a home area network, one DMS located on a network side outside the home area network, and one DMC are included in this embodiment. The two DMSs located in the home area network are respectively a DMS1 and a DMS2, and the DMS located on the network side outside the home area network is specifically a Cloud Server. In addition, in this embodiment, a media resource is a media file for illustration, each media file is corresponding to a media resource object, the media resource object includes description information of the media file corresponding to the media resource object, and the description information of the media file may be CDS metadata information. The media processing method in this embodiment may include the following steps:

S301: Each DMS sends a media content directory of a media file stored on each DMS to the DMC.

As shown in FIG. 3A, three DMSs are included in this embodiment and are respectively the DMS1, the DMS2, and the Cloud Server. After each DMS is online, the DMC discovers each DMS and invokes a CDS::Browse( )/Search( ) command to each DMS. After receiving the command, each DMS sends the media content directory stored on a device of each DMS to the DMC.

S302: The DMC identifies a media resource object corresponding to each media file stored on each DMS.

Specifically, the DMS1, the DMS2, and the Cloud Server separately identify the media resource objects of the media files stored on the DMS1, the DMS2, and the Cloud Server. Media files that have same content may have different media formats or resolution; therefore, it cannot be determined, only according to media formats or resolution, whether content of media files is the same. A specific identification method is analyzing some fields that are in metadata information in a media content directory and that can represent media content attributes, where the fields include a media title, program duration, film information, and the like. For example, metadata information of three media files stored on the DMS1 is shown in Table 1.

determined that there is a high possibility that the three media files have same media content. Certainly, in actual determining, a difference may exist between duration of programs provided by different content providers; for example, opening credits and closing credits of movies provided by some content providers are cut. Therefore, program duration may not necessarily be identical; however, a proper deviation range needs to be ensured (for example, generally, total duration of opening credits and closing credits of a movie is between one and a half minutes and three minutes, and the duration may be used as a proper deviation range). Then, the <film information> field is analyzed. As shown in Table 1, information about the three media files such as publisher information and director information is identical; therefore, it may be determined that the three media files are of a same movie. It is determined, by analyzing the foregoing field information and based on comprehensive consideration, that the three media files have same media content.

S303: Integrate media resource objects corresponding to at least two media files that have same media content, and generate a content list.

After the identification process in step S302, when the at least two media files have same media content, the media

TABLE 1

Metadata Information of the Three Media Files Stored on the DMS1

| | Media file identification number | | |
|---|---|---|---|
| | <itemID="0"> | <itemID="1"> | <itemID="2"> |
| Title field | <dc:title>AVATAR</dc:title> | <dc:title>AVATAR</dc:title> | <dc:title>AVATAR</dc:title> |
| Media resource field | <res size="232246026"duration="1:32:48:00" resolution="1280×720" protocolInfo="http-get::video/xms-wmv:..."> http://10.11.84.153/avatar.wmv </res> | <res size="542246026"duration="1:32:48:00" resolution="1920×1080" protocolInfo="http-get::video/mpeg:..."> http://10.11.84.153/avatar.mpeg </res> | <res size="152246026"duration="1:32:48:00 resolution="960×600" protocolInfo="http-get::video/mp4:..>" http://10.11.84.153/avatar.mp4 </res> |
| Film information field | <film information> | <film information> | <film information> |
| Publisher | <publisher>20 Century Fox</publisher> | <publisher>20 Century Fox</publisher> | <publisher>20 Century Fox</publisher> |
| Director | <director>James Cameron</director> ... </film information> </item> | <director>James Cameron</director> ... </film information> </item> | <director>James Cameron</director> ... </film information> </item> |

In Table 1, the metadata information includes the title field <dc:title>, the media resource field <res>, and the film information field <film information>. The <res> field includes information such as a file size "size", program duration "duration", resolution "resolution", a media format "protocolInfo", and a file address URL, and the <film information> field includes information such as a publisher <publisher> and a director <director>. In an identification process, first, the title field <dc:title> is analyzed. As shown in Table 1, title field information of the three media files is the same; therefore, it is determined that there is a possibility that the three media files have same media content. Certainly, in actual determining, titles may not necessarily be identical; however, it needs to be ensured that main parts or most characters in titles are the same. Then, program duration is analyzed. As shown in Table 1, the program duration of the three media files is also the same; therefore, it is resource objects corresponding to the at least two media files are integrated. An integration manner may be specifically either of the following two manners.

Manner 1: The media resource objects corresponding to the at least two media files that have same media content are marked. Specifically, the DMS1, the DMS2, and the Cloud Server analyze metadata information in the media resource objects corresponding to the media files stored on the DMS1, the DMS2, and the Cloud Server respectively. If a conclusion is drawn that there are media files that have same media content, media resource objects corresponding to these media files are marked to indicate that these media files have same media content. A <link> field is added to metadata information in a media resource object in a media content directory for marking, where the <link> field includes an identification number and address information that are of another media file that has same content as a media file corresponding to the media resource object. As shown in Table 1, the media files whose media file identification numbers are "0", "1", and "2" have same media content, that is, all of the media files are of the movie AVATAR. Metadata information in media resource objects in media content directories corresponding to the foregoing three media files is separately updated, and the <link> field is added. The media file whose media identification number is "0" is used as an example. As shown in Table 2, in a case in which it is identified that media files have same media content, identification numbers and address information that are of media files that have same content as the media file whose media file identification number is "0" are added after metadata information of the media file whose media file identification number is "0".

TABLE 2

Marked Metadata Information of the Media File whose Identification Number is "0"
<itemID="0">

<dc:title>AVATAR</dc:title>
<res size="232246026"duration="1:32:48:00" resolution="1280×720" protocolInfo="http-get::video/xms-wmv:..."> http://10.11.84.153/avatar.wmv
<link> <itemID>1</itemID>
<currentURL>http://10.11.84.153/avatar.mp4</currentURL>
<link> <itemID>2</itemID>
<currentURL>http://10.11.84.153/avatar.mpeg </currentURL>

Manner 2: The media resource objects corresponding to the at least two media files that have same media content are combined to generate a reference media resource object. Specifically, the media resource objects corresponding to the at least two media files that have same media content are combined to generate the reference media resource object, where the reference resource object includes metadata information of the media files that have same media content. For example, in Table 1, the media files whose media file identification numbers are "0", "1", and "2" have same media content, that is, the media files are all the movie AVATAR. Metadata information in media resource objects in media content directories corresponding to the foregoing three media files is combined to generate a reference media resource object, that is, the metadata information in the media resource objects corresponding to the foregoing three media files are placed into the reference resource object, and the media resource objects corresponding to the foregoing three media files are deleted. Alternatively, one of the media resource objects may be used as a reference media resource object, metadata information in the other media resource objects that have same media content as the media resource object is combined into the reference media resource object, and the other media resource objects, except the reference media resource object, in the media resource objects are deleted.

The content list is generated according to a media content directory obtained after integration in either manner in the foregoing two manners, where media resource objects that have same media content and are in the content list are represented by only one media identifier; therefore, the content list to be presented to a user does not include same media identifiers.

S304: The DMC acquires device capability information of a DMR discovered in a home area network and a list of media formats for which decoding is supported.

Figure 5:
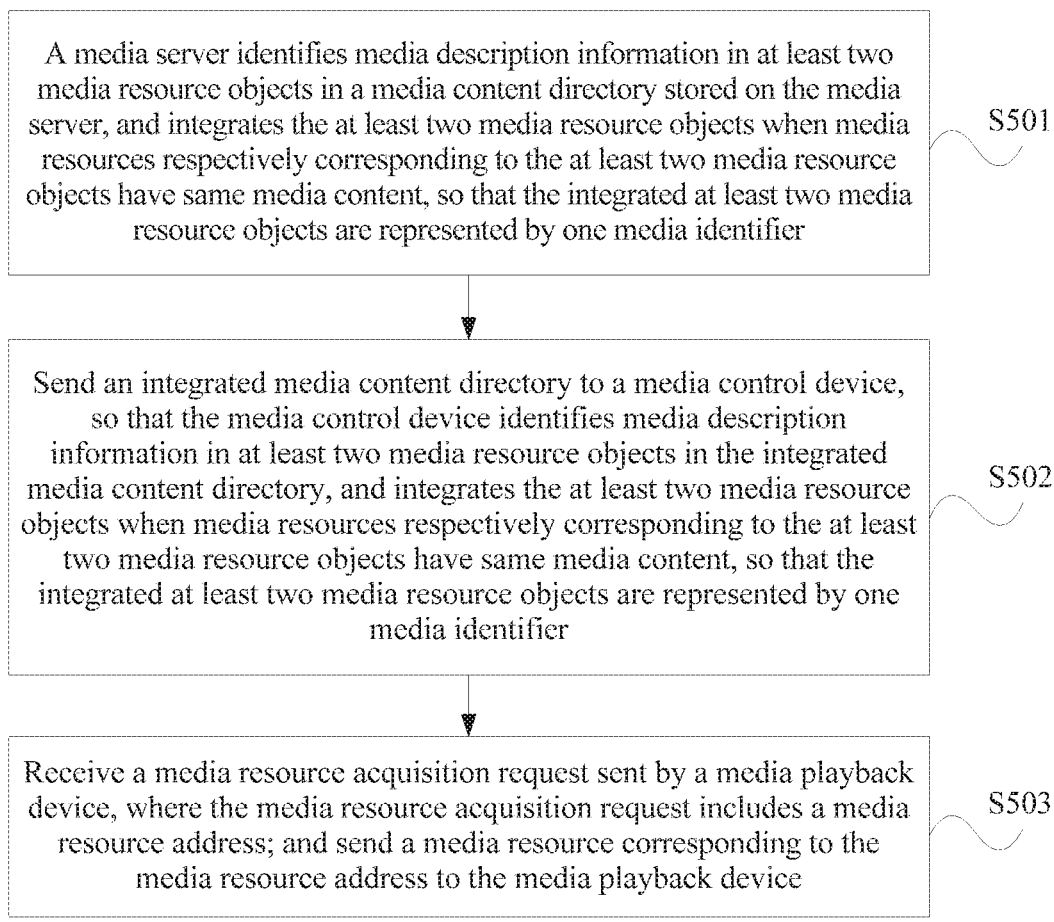
FIG. 5 is a flowchart of Embodiment 5 of a media processing method according to the present invention.

As shown in FIG. 5, in this embodiment, there are three DMR devices in the home area network in total: a DMR1, a DMR2, and a DMR3, and specific physical devices are respectively a tablet computer (Tablet), a smartphone (Smartphone), and a television set (TV). After discovering the three DMR devices in the home area network, the DMC invokes an AVT::GetDeviceCapabilities( ) command to each of the three DMR devices. After receiving the command, each of the three DMR devices sends, to the DMC, device capability information of each of the three DMR devices and a list of media formats for which decoding is supported. The device capability information includes a screen size, screen resolution, and the like. Specific device capability information and specific information of the lists of media formats for which decoding is supported are shown in Table 3.

TABLE 3

Device Capability Information of the DMR Devices and the Lists of Supported Media Formats

| | Digital media player | | |
|---|---|---|---|
| | Tablet computer (Tablet) | Smartphone (Smartphone) | Television set (TV) |
| Screen size Screen resolution | Screen size: 9.7 inch Resolution: 1280 × 720 | Screen size: 5.1 inch Resolution: 1024 × 768 | Screen size: 4.2 inch Resolution: 1920 × 1080 |
| List of media formats for which decoding is supported | Supported media formats profiles: MPEG_TS_SD_NA MPEG4_TS_HD AVC_MP4_AAC AVC_WMV_MP_HD . . . | Supported media formats profiles: MPEG_TS_SD_NA MPEG4_TS_HD AVC_MP4_AAC AVC_3GPP_SD . . . | Supported media formats profiles: MPEG_TS_SD_NA MPEG4_TS_HD AVC_MP4_AAC AVC_MPEG_HD . . . |

S305: The DMC performs matching between each of the media files that have same media content and acquired device capability information of each of multiple DMRs and each of acquired media formats for which decoding is supported, to generate a match list.

Specifically, after acquiring the media content directory obtained after integration and updating, device capabilities of the DMRs, and the lists of media formats for which decoding is supported, the DMC performs matching between the media files and the playback devices. The matching is performed for a media file suitable to be played on a specific DMR, to generate the match list.

A priority that is of a media file and relative to a DMR may be specifically acquired in either of the following two manners, so as to generate a match list.

Manner 1: A priority that is of more than one media file and relative to a DMR is determined according to resolution of the media file and device capability information of the DMR.

The DMR1 (Tablet) is used as an example. As shown in Table 3, the DMR has a screen size of 9.7 inches and screen resolution of 1280×720, and media formats for which decoding is supported (Supported media formats profiles) are shown in Table 3. Then, the metadata information of the three media files whose media identification numbers are "0", "1", and "2" is analyzed, where it is determined that the three media files have same media content. It is discovered that for the media file "0", a media encapsulation format is WMV, media resolution is 1280×720; for the media file "1", an encapsulation format is MPEG, and media resolution is 1920×1080; and for the media file "2", a media encapsulation format is MP4, and media resolution is 960×600. It is discovered, by matching, that the Tablet supports media formats of the media "0" and the media "1", but does not support the media format of the media "2", that is, the media "2" cannot be played on the Tablet. The resolution of the media file "0" is 1920×1080, and is the same as the screen resolution of the Tablet; therefore, a better playback effect is obtained when the media file "0" is being played on the Tablet. Therefore, a conclusion may be drawn that both the media file "0" and the media file "1" can be played on the DMR1, but the media file "0" is more suitable to be played on the DMR1, and a playback priority sequence of the DMR1 is 0, 1. Likewise, it may be learned that a playback priority sequence of the DMR2 (Smartphone) is 1, 0, and a playback priority sequence of the DMR3 (TV) is 2, 0, 1. Therefore, a match list may be obtained and shown in Table 4.

TABLE 4

Match List for the Media files and the Playback Devices

| Media File Identification Number (itemID) | Playback Device |
| --- | --- |
| 0, 1 | DMR1 (Tablet) |
| 1, 0 | DMR2 (Smartphone) |
| 2, 0, 1 | DMR3 (TV) |

Manner 2: A priority that is of more than one media file and relative to a DMR is determined according to a playback status of the media file.

Specifically, a digital media control device sends a media data request message to a DMR, where the media data request message includes a storage path of a media file and a range of to-be-prefetched data. The DMR prefetches some media files from a DMS according to the media data request message, performs decoding, attempts to perform playback, and detects a playback effect. The Tablet (DMR1) is used as an example in a specific implementation manner. After prefetching a part of media data in the three media files "0", "1", and "2", the DMR1 separately decodes the media data, and discovers that both the media "0" and the media "1" can be decoded, but decoding of the media "2" fails. In this case, it is considered that the media "2" cannot be played on the DMR1. Then, the DMR1 performs a playback attempt on the media "0" and the media "1", and detects a playback effect of the DMR1. It is discovered that a playback response delay of the media "0" is less than a playback response delay of the media "1", which demonstrates that the media "0" is more suitable to be played on the DMR1. Therefore, a priority sequence in a match list is 0, 1. Likewise, according to the foregoing method, it may be learned that a playback priority sequence of the DMR2 (Smartphone) is 1, 0, and a playback priority sequence of the DMR3 (TV) is 2, 0, 1. Then, a match list shown in Table 4 is generated.

S306: When a user selects media content to be played on a playback device, the DMC selects, according to the match list, a proper media file to be played on the playback device selected by the user.

When the user clicks a media title "AVATAR" (the media includes three different media files) on the DMC, and selects the DMR1 (Tablet) device to play the media files, the DMC learns, according to the match list (shown in Table 4) generated in step S305, that a media file that is suitable to be played on the DMR1 (Tablet) is the media file whose media file identification number is "0", and determines that a media stream to be pushed to the DMR1 is a media stream of the media file "0". A specific implementation manner is: invoking, by the DMC, an AVT::SetAVTransportURI( ) command to the DMR1, where the command information includes URL address information and related metadata information that are of the media file "0," and requesting, by the DMR1 according to the received URL address information of the media file "0," media data from the digital media server DMS1 that stores the media file "0," and playing the media file "0."

According to the media processing method provided in this embodiment, a DMC acquires a media content directory of each DMS; identifies, according to the media content directory of each DMS, a media resource object corresponding to each media file stored on each DMS; if it is determined that at least two media files that have same media content exist in media files stored on at least two DMSs, integrates media resource objects corresponding to the at least two media files that have same content, so that the integrated media resource objects are represented by only one media identifier; generates a content list, and presents the content list to a user, where the content list does not include same media identifiers, and the content list includes media identifiers of media files that have different media content and that are stored on the DMSs and the media identifier of the at least two media files that have same media content. Therefore, it is implemented that media files that are in a media content directory and have same media content are associated with each other, media identifiers of multiple media files that have same media content do not exist in a media content list, and in a playback process, for different DMRs, media files that are suitable to be played on the different DMRs are pushed to the different DMRs according to device capability information of the different DMRs, so that a user can acquire better user experience.

Figure 4:
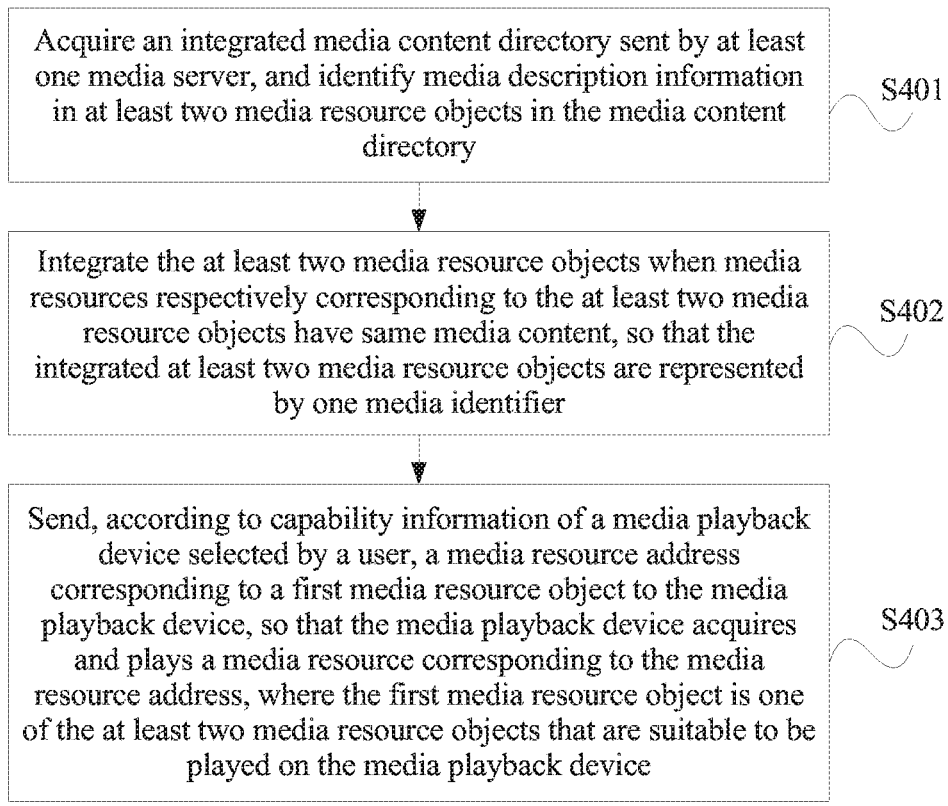
FIG. 4 is a flowchart of Embodiment 4 of a media processing method according to the present invention.

FIG. 4 is a flowchart of Embodiment 4 of a media processing method according to the present invention. This embodiment is executed by a media control device, and this embodiment differs from Embodiment 1 shown in FIG. 1 in that a media content directory acquired by a media controller is a media content directory obtained after integration by a media server. As shown in FIG. 4, the method in this embodiment may include the following steps.

S401: Acquire an integrated media content directory sent by at least one media server, and identify media description information in at least two media resource objects in the media content directory.

When an integrated media content directory sent by only one media server is received, there is no need to identify the media description information in the at least two media resource objects in the media content directory, and step S403 is directly executed.

S402: Integrate the at least two media resource objects when media resources respectively corresponding to the at least two media resource objects have same media content, so that the integrated at least two media resource objects are represented by one media identifier.

S403: Send, according to capability information of a media playback device selected by a user, a media resource address corresponding to a first media resource object to the media playback device, so that the media playback device acquires and plays a media resource corresponding to the media resource address, where the first media resource object is one of the at least two media resource objects that are suitable to be played on the media playback device.

The identifying media description information in at least two media resource objects in the media content directory may be specifically: in at least two media resource objects that are in the integrated media content directory and belong to different media servers, performing matching on at least one of a media title, duration, and film information that are in media description information in each media resource object, to determine whether at least two media resources that have same media content exist, where the film information may include publisher information, director information, starring information, and the like.

Specifically, a specific implementation manner of the performing matching on at least one of a media title, duration, and film information that are in media description information in each media resource object, to determine whether at least two media resources that have same media content exist is: if any condition or any two conditions or three conditions in the following conditions (1), (2), and (3) is or are met, it may be determined that at least two media resources have same media content: (1) media titles in media description information corresponding to at least two media resources include a proportion of characters that are the same, where the proportion exceeds a first threshold; (2) a duration deviation in the media description information corresponding to the at least two media resources falls within a preset range; and (3) film information in the media description information corresponding to the at least two media resources is the same.

In the foregoing process of determining whether at least two media resources that have same media content exist, one preferable manner may be: if media titles in media description information corresponding to at least two media resources include a proportion of characters that are the same, where the proportion exceeds the first threshold, determining whether a duration deviation in the media description information corresponding to the at least two media resources falls within the preset range; if the duration deviation in the media description information corresponding to the at least two media resources falls within the preset range, determining whether film information in the media description information corresponding to the at least two media resources is the same; and if the film information in the media description information corresponding to the at least two media resources is the same, determining that the at least two media resources have same media content.

Optionally, when the media resources respectively corresponding to the at least two media resource objects have same media content, the at least two media resource objects may be integrated in either of the following two manners: (1) each media resource object of the at least two media resource objects is marked, where the marking is adding, to each media resource object of the at least two media resource objects, an identification number and address information that are of another media resource object of the at least two media resource objects, and the marked at least two media resource objects are represented by one media identifier; (2) the at least two media resource objects are combined to generate a reference media resource object, where the reference media resource object includes the media description information in each media resource object of the at least two media resource objects, and the at least two media resource objects are represented by a media identifier of the reference media resource object.

Optionally, before step S403, the method may further include: performing matching between each of the at least two media resource objects and playback capability information of each of at least one media playback device, and determining a media playback device that supports playback of media resources corresponding to all media resource objects in the at least two media resource objects.

Matching may be performed between each of the at least two media resource objects and playback capability information of each of at least one media playback device in either of the following two manners: (1) matching is performed between a media format and resolution that are of each of the at least two media resource objects and a media format for which decoding is supported and display resolution that are in the device capability information of each of the at least one media playback device; (2) a media data request message is sent to the at least one media playback device, so that the at least one media playback device prefetches, according to the media data request message, at least a part of media resource data from the DMS for a playback attempt.

The media data request message may include a storage path of the media resources and a range of to-be-prefetched data.

Optionally, a specific implementation manner of step S403 is: receiving a playback request of the user, where the playback request includes the media playback device selected from the at least one media playback device and a requested media identifier; determining the first media resource object if the requested media identifier is the media identifier corresponding to the at least two media resources that have same media content, where the first media resource object is a media resource that is in the at least two media resources and whose playback is supported by the selected media playback device; and sending a playback command to the selected media playback device, where the playback command carries the media resource address corresponding to the first media resource object, so that the selected media playback device plays the media resource whose playback is supported.

The determining a media playback device that supports playback of media resources corresponding to all media resource objects in the at least two media resource objects may be: if a quantity of media resources that are in the at least two media resource objects and whose playback is supported by a media playback device is greater than one, determining, according to resolution of the more than one media resource and device capability information of the media playback device, a playback priority that is of the more than one media resource and relative to the media playback device; or if there is more than one media resource that is in the at least two media resource objects and whose playback is supported by a media playback device, determining, according to a playback response delay effect of the more than one media resource, a playback priority that is of the more than one media resource and relative to the media playback device. Then, a media resource that is in the at least two media resource objects, whose playback is supported by the selected media playback device, and that has a highest playback priority is determined, where the playback command carries a media resource address of the media resource whose playback is supported by the selected media playback device and that has the highest playback priority.

After the foregoing step, a switch request of the user may be further received, where the switch request includes identification numbers of a to-be-switched-to media playback device and a to-be-switched-to media resource; if the to-be-switched-to media resource is one of the at least two media resources that have same media content, and the to-be-switched-to media playback device does not support playback of the to-be-switched-to media resource, a media resource that is in the at least two media resources and whose playback is supported by the to-be-switched-to media playback device is determined; and a playback command is sent to the to-be-switched-to media playback device, where the playback command carries a media resource address of the media resource whose playback is supported by the to-be-switched-to media playback device, so that the to-be-switched-to media playback device plays the media resource whose playback is supported.

The switch request further includes a current playback moment; and if duration of the media resource that is in the at least two media resources and whose playback is supported by the to-be-switched-to media playback device is the same as duration of the to-be-switched-to media resource, the playback command is sent to the to-be-switched-to media playback device, where the playback command further includes the current playback moment, so that the to-be-switched-to media playback device starts, from the current playback moment, to play the media resource whose playback is supported, where switching fails if the duration of the media resource that is in the at least two media resources and whose playback is supported by the to-be-switched-to media playback device is different from the duration of the to-be-switched-to media resource.

Optionally, after the determining a media playback device that supports playback of all media resources in the at least two media resources, a match list may be further generated, where the match list includes an identifier of a media playback device and an identification number of a media resource that is in the at least two media resources and whose playback is supported by the media playback device; and then, an identification number of the media resource that is in the at least two media resources and whose playback is supported by the selected media playback device is determined according to the match list.

According to the media processing method provided in this embodiment, an integrated media content directory sent by at least one media server is received, media description information in at least two media resource objects in the media content directory is identified, and the at least two media resource objects are integrated when media resources respectively corresponding to the at least two media resource objects have same media content, so that the integrated at least two media resource objects are represented by one media identifier; therefore, a content list that is generated according to the integrated media resource objects and is to be presented to a user does not include same media identifiers. A media resource address corresponding to a media resource object of the at least two media resource objects suitable to be played on a media playback device selected by the user is sent to the media playback device according to capability information of the media playback device, so that the media playback device acquires and plays a media resource corresponding to the media resource address. Therefore, it is implemented that media files that are in a media content directory and have same media content are associated with each other, a media identifier in a content list to be presented to a user is unique, and in a playback process, media resources that are suitable to be played on different media playback devices are pushed to the different media playback devices.

FIG. 5 is a flowchart of Embodiment 5 of a media processing method according to the present invention. This embodiment is executed by a media server. As shown in FIG. 5, the method in this embodiment may include the following steps.

S501: The media server identifies media description information in at least two media resource objects in a media content directory stored on the media server, and integrates the at least two media resource objects when media resources respectively corresponding to the at least two media resource objects have same media content, so that the integrated at least two media resource objects are represented by one media identifier.

S502: Send an integrated media content directory to a media control device, so that the media control device identifies media description information in at least two media resource objects in the integrated media content directory, and integrates the at least two media resource objects when media resources respectively corresponding to the at least two media resource objects have same media content, so that the integrated at least two media resource objects are represented by one media identifier.

S503: Receive a media resource acquisition request sent by a media playback device, where the media resource acquisition request includes a media resource address; and send a media resource corresponding to the media resource address to the media playback device.

The identifying media description information in at least two media resource objects in a media content directory stored on the media server in step S501 may be specifically: performing matching on at least one of a media title, duration, and film information that are in media description information in each media resource object, to determine whether at least two media resources that have same media content exist, where optionally, the film information may include publisher information, director information, starring information, and the like.

The performing matching on at least one of a media title, duration, and film information that are in media description information in each media resource object, to determine whether at least two media resources that have same media content exist may be specifically implemented by using the following step: if any condition or any two conditions or three conditions in the following conditions (1), (2), and (3) is or are met, it may be determined that at least two media resources have same media content: (1) media titles in media description information corresponding to at least two media resources include a proportion of characters that are the same, where the proportion exceeds a first threshold; (2) a duration deviation in the media description information corresponding to the at least two media resources falls within a preset range; and (3) film information in the media description information corresponding to the at least two media resources is the same.

In the foregoing process of determining whether at least two media resources that have same media content exist, one preferable manner may be: if media titles in media description information corresponding to at least two media resources include a proportion of characters that are the same, where the proportion exceeds the first threshold, determining whether a duration deviation in the media description information corresponding to the at least two media resources falls within the preset range; if the duration deviation in the media description information corresponding to the at least two media resources falls within the preset range, determining whether film information in the media description information corresponding to the at least two media resources is the same; and if the film information in the media description information corresponding to the at least two media resources is the same, determining that the at least two media resources have same media content.

The integrating the at least two media resource objects when media resources respectively corresponding to the at least two media resource objects have same media content, so that the integrated at least two media resource objects are represented by one media identifier may be implemented in either of the following two manners: (1) when the media resources respectively corresponding to the at least two media resource objects have same media content, each media resource object of the at least two media resource objects is marked, where the marking is adding, to each media resource object of the at least two media resource objects, an identification number and address information that are of another media resource object of the at least two media resource objects, and the marked at least two media resource objects are represented by one media identifier; (2) when the media resources respectively corresponding to the at least two media resource objects have same media content, the at least two media resource objects are combined to generate a reference media resource object, where the reference media resource object includes the media description information in each media resource object of the at least two media resource objects, and the at least two media resource objects are represented by a media identifier of the reference media resource object.

According to the media processing method provided in this embodiment, each media server identifies media description information in each media resource object in a media content directory stored on each media server, and integrates at least two media resource objects when media resources respectively corresponding to the at least two media resource objects have same media content, so that the integrated at least two media resource objects are represented by one media identifier. Each media server sends an integrated media content directory to a media control device, and the media control device identifies media description information in a media resource object in each integrated media content directory, and integrates media resource objects that have same media content. The media server receives a media resource acquisition request sent by a media playback device, where the media resource acquisition request includes a media resource address; and sends a media resource corresponding to the media resource address to the media playback device. Therefore, it is implemented that media resource objects corresponding to media files that are in a media content directory and have same media content are associated with each other, multiple media identifiers that have same media content do not exist in a content list to be presented to a user, and a media identifier is unique.

Figure 6A:
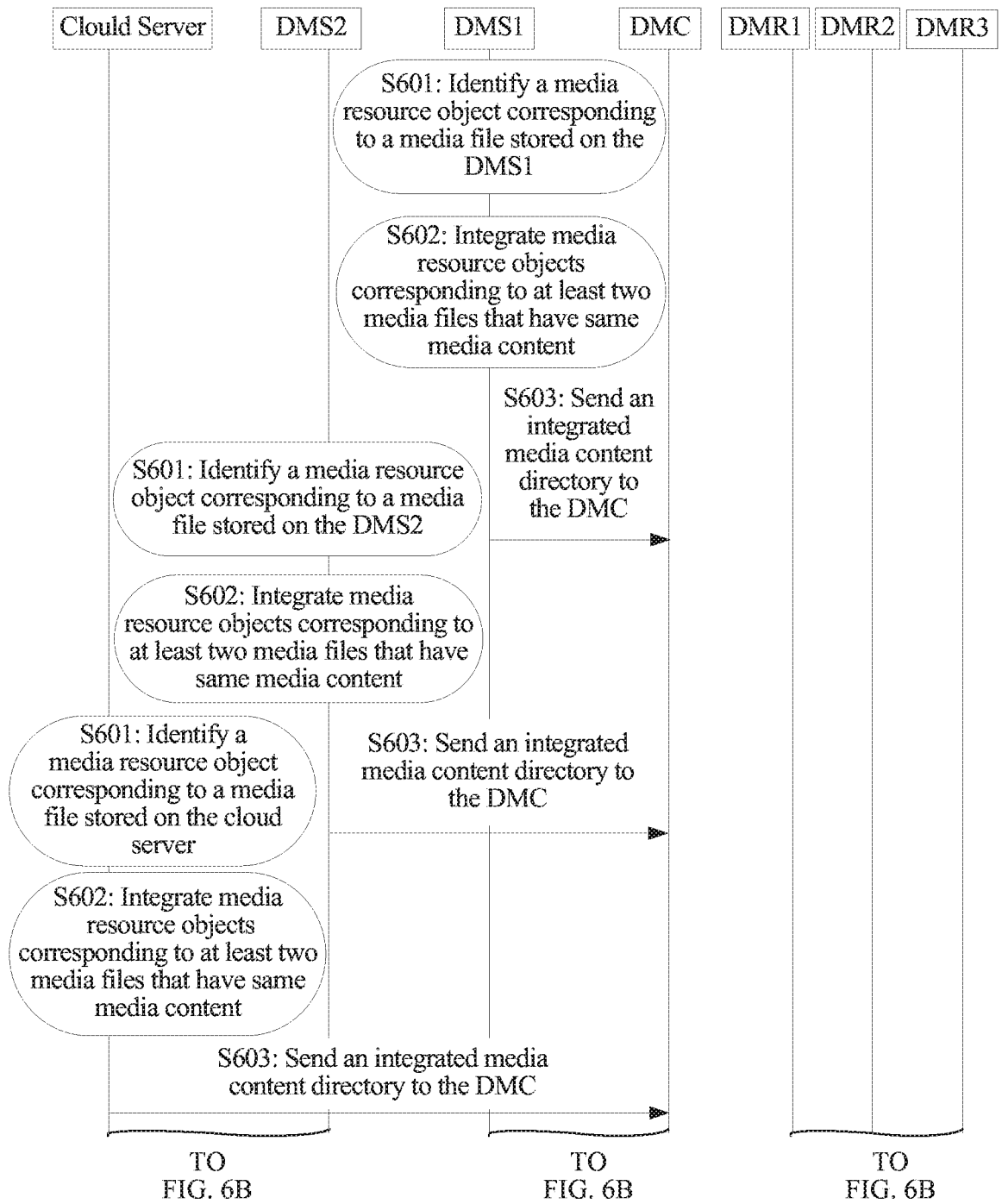
FIG. 6A and FIG. 6B are signaling flowcharts of Embodiment 6 of a media processing method according to the present invention.
Figure 6B:
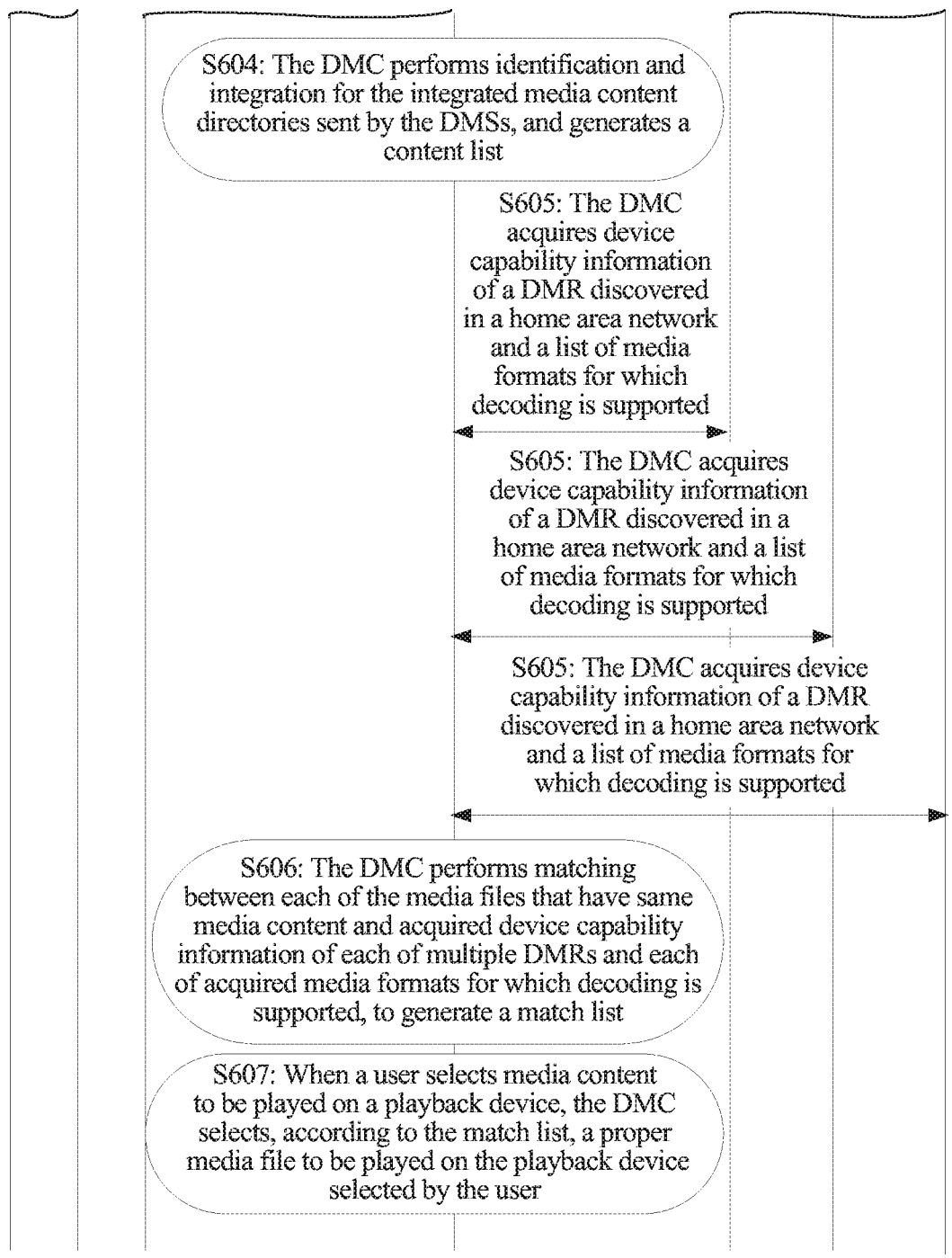

FIG. 6A and FIG. 6B is a signaling flowchart of Embodiment 6 of a media processing method according to the present invention. The following describes in detail, by using a specific embodiment, the methods shown in FIG. 4 and FIG. 5. As shown in FIG. 6A, two DMSs located in a home area network, one DMS located on a network side outside the home area network, and one DMC are included in this embodiment. The two DMSs located in the home area network are respectively a DMS1 and a DMS2, and the DMS located on the network side outside the home area network is specifically a Cloud Server. In addition, in this embodiment, a media resource is a media file for illustration, each media file is corresponding to a media resource object, the media resource object includes description information of the media file corresponding to the media resource object, and the description information of the media file may be CDS metadata information. The media processing method in this embodiment may include the following steps:

S601: Identify a media resource object corresponding to a media file stored on each DMS.

The DMSs (the DMS1, the DMS2, and the Cloud Server) identify the media resource objects corresponding to the media files stored on the DMSs. For a specific implementation process, reference may be made to the method, in step S302, for identifying, by a DMC, a media resource object corresponding to each media file on each DMS, and details are not described herein again.

S602: Integrate media resource objects corresponding to at least two media files that have same media content.

The DMSs integrate the media resource objects corresponding to the media files stored on the DMSs. For a specific implementation process, reference may be made to the integration method in step S303, and details are not described herein again.

S603: Send an integrated media content directory to the DMC.

The DMSs send the media content directories obtained after integration by the DMSs to the DMC.

S604: The DMC performs identification and integration for the integrated media content directories sent by the DMSs, and generates a content list.

Specifically, the DMC identifies the integrated media content directories sent by the DMS1, the DMS2, and the Cloud Server. An identification process of the DMC is mainly performed on media resource objects corresponding to media resources that are on different DMSs and that have same media content. For a specific identification process, reference may be made to the identification method in step S302, for an integration process, reference may be made to the integration method in step S303, and details are not described herein again. Then, the content list is generated, where only one media identifier is displayed in the content list for media resources that have same content.

S605: The DMC acquires device capability information of a DMR discovered in a home area network and a list of media formats for which decoding is supported.

S606: The DMC performs matching between each of the media files that have same media content and acquired device capability information of each of multiple DMRs and each of acquired media formats for which decoding is supported, to generate a match list.

S607: When a user selects media content to be played on a playback device, the DMC selects, according to the match list, a proper media file to be played on the playback device selected by the user.

A specific implementation process of step S605 to step S607 is the same as that of step S304 to step S306 in Embodiment 3, and details are not described herein again.

According to the media processing method provided in this embodiment, DMSs identify media resource objects corresponding to media files stored on the DMSs, integrate media resource objects corresponding to at least two media files that have same media content, and send integrated media content directories to a DMC. For media resources that are on different DMSs and have same media content, the DMC performs identification and integration again for the integrated media content directories sent by the DMSs, and generates a content list. Therefore, it is implemented that media resource objects corresponding to media resources that have same media content are associated with each other, and a media identifier in the content list is unique. Further, the DMC acquires device capability information of a DMR discovered in a home area network and a list of media formats for which decoding is supported, and the DMC performs matching between each of the media files that have same media content and acquired device capability information of each of multiple DMRs and each of acquired media formats for which decoding is supported, to generate a match list. When a user selects media content to be played on a playback device, the DMC selects, according to the match list, a proper media file to be played on the playback device selected by the user. Therefore, it is implemented that in a playback process, media resources that are suitable to be played on different DMRs are pushed to the different DMRs.

Figure 7A:
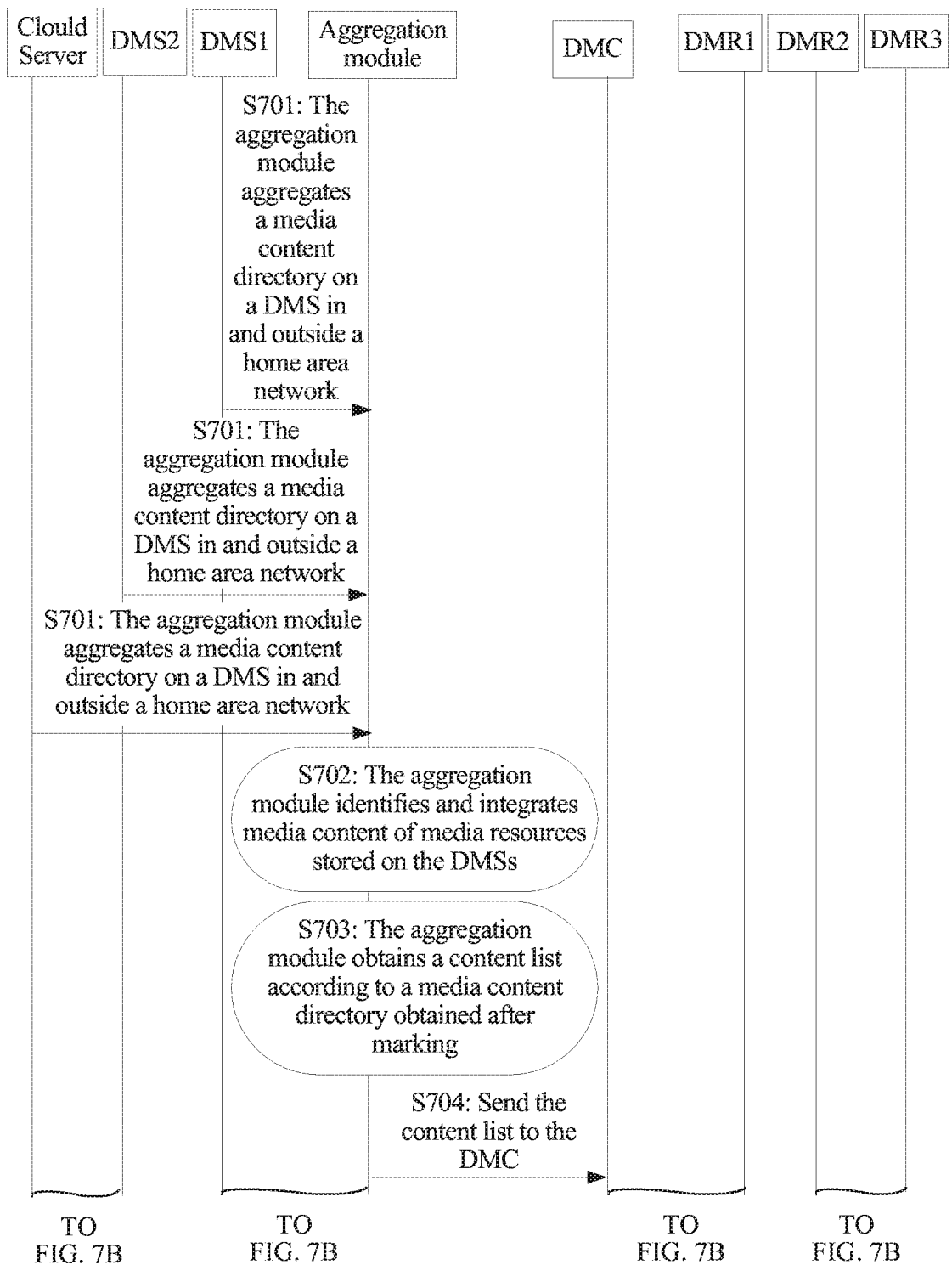
FIG. 7A and FIG. 7B are signaling flowcharts of Embodiment 7 of a media processing method according to the present invention.
Figure 7B:
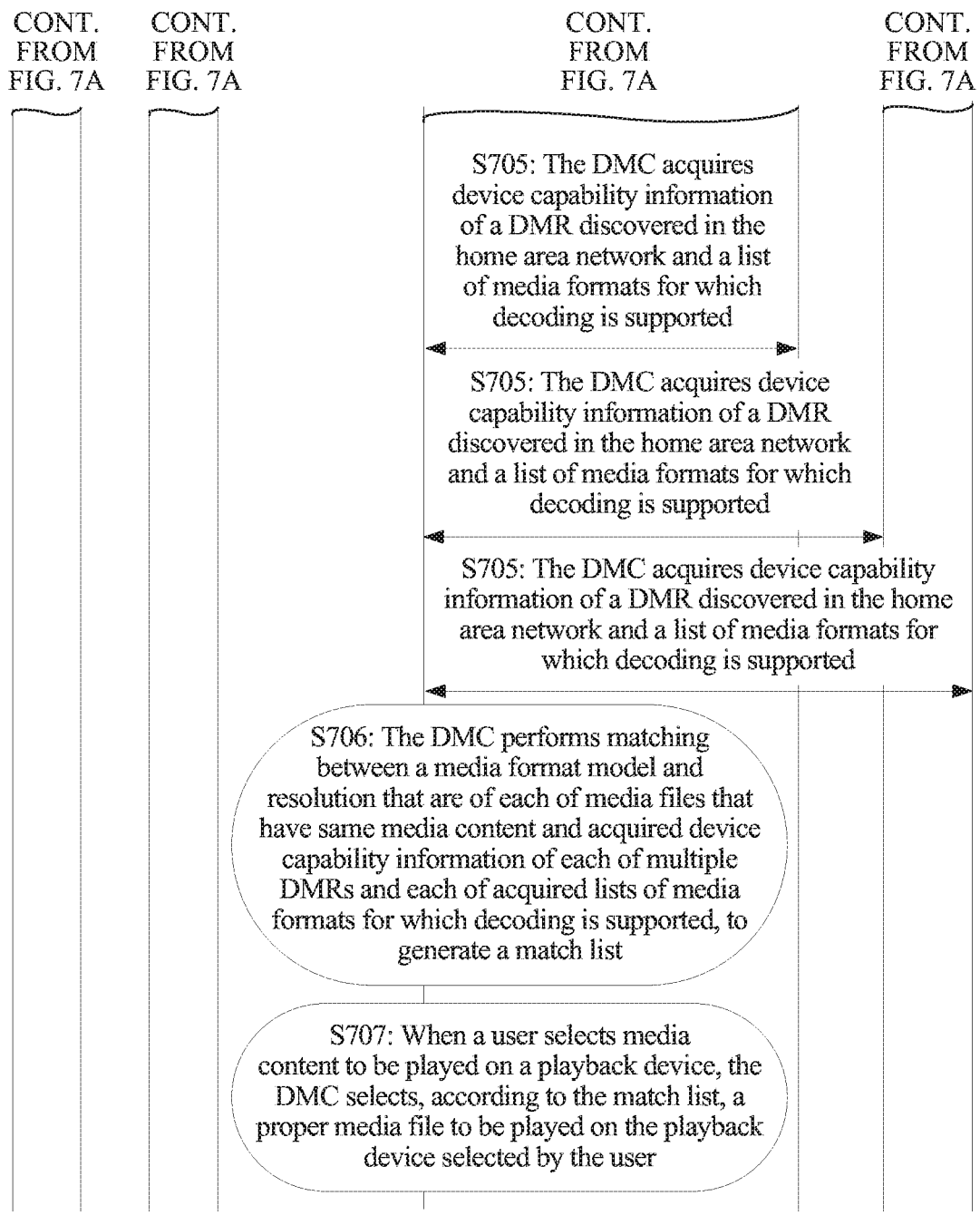

FIG. 7A and FIG. 7B are signaling flowcharts of Embodiment 7 of a media processing method according to the present invention. As shown in FIG. 7A, based on Embodiment 3, an aggregation module (AO) is introduced in this embodiment, and the media processing method may include the following steps.

S701: The aggregation module aggregates a media content directory on each DMS in and outside a home area network.

As shown in FIG. 7A, in this embodiment, after a DMS1, a DMS2, and a Cloud Server are online, when detecting that there is an aggregation module in the home area network, the three DMSs report the media content directories stored on the DMSs to the aggregation module.

S702: The aggregation module identifies and integrates media content of media resources stored on the DMSs.

The aggregation module identifies, according to the media content directories sent by the DMSs, media resource objects corresponding to the media resources stored on the DMSs, and if it is determined that two or more than two media resources that have same media content exist, integrates media resource objects corresponding to the media resources. For a specific identification and integration process, reference may be made to step S302 and step S303.

S703: The aggregation module obtains a content list according to an integrated media content directory.

A media identifier in the content list is unique.

S704: Send the content list to the DMC, so that the DMC presents the content list to a user.

Specifically, the DMC invokes a CDS::Browse( )/Search( ) command to the aggregation module, after receiving the command information, the aggregation module sends the media content directory obtained after identification and integration and the generated content list to the DMC, and the DMC presents the content list to the user.

S705: The DMC acquires device capability information of a DMR discovered in the home area network and a list of media formats for which decoding is supported.

S706: The DMC performs matching between a media format model and resolution that are of each of media files that have same media content and acquired device capability information of each of multiple DMRs and each of acquired lists of media formats for which decoding is supported, to generate a match list.

S707: When the user selects media content to be played on a playback device, the DMC selects, according to the match list, a proper media file to be played on the playback device selected by the user.

A specific implementation process of step S705 to step S707 is the same as that of step S304 to step S506 in Embodiment 3, and details are not described herein again.

According to the media processing method provided in this embodiment, an aggregation module acquires media content directories on DMSs; identifies, according to the media content directories on the DMSs, media content of media resources stored on the DMSs; and if it is determined that at least two media resources that have same media content exist in media resources stored on at least two DMSs, integrates, in media content directories corresponding to the at least two DMSs, media resource objects corresponding to the at least two media resources. The aggregation module obtains a content list according to an integrated media content directory, and sends the content list to a DMC, and the DMC presents the content list to a user, where the content list includes media identifiers of media resources that are stored on the DMSs and that have different media content and a media identifier of the at least two media resources that have same media content. Therefore, it is implemented that media resources that are in a media content directory and have same media content are associated with each other, media identifiers of multiple media files that have same media content do not exist in a media content list, and in a playback process, media resources that are suitable to be played on different DMRs are pushed to the different DMRs.

Figure 8:
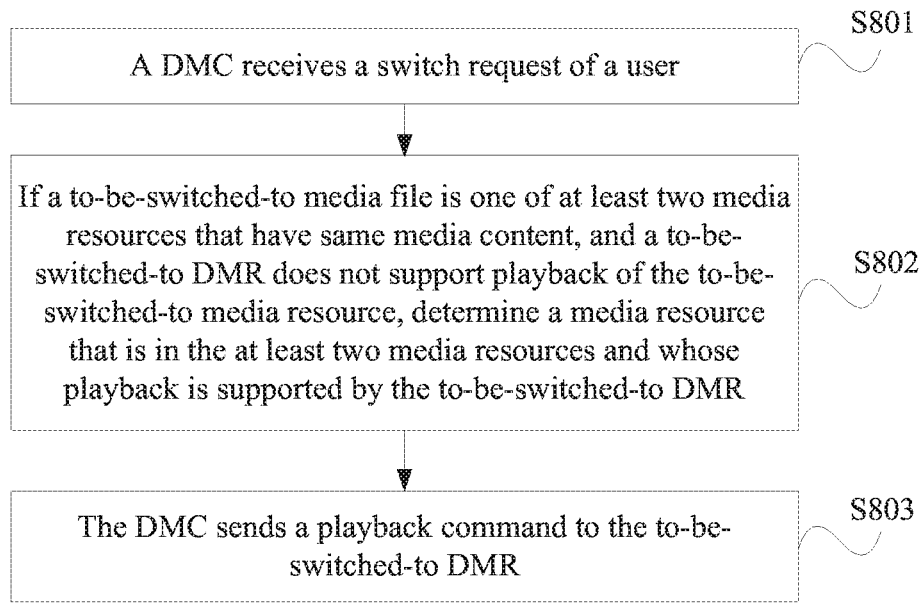
FIG. 8 is a signaling flowchart of Embodiment 8 of a media processing method according to the present invention.

FIG. 8 is a signaling flowchart of Embodiment 8 of a media processing method according to the present invention. As shown in FIG. 8, based on any embodiment in Embodiment 3, Embodiment 6, and Embodiment 7, in this embodiment, after a user selects media content to be played on a playback device, and a DMC selects, according to a match list, a proper media file to be played on the playback device selected by the user, the following steps are further included.

S801: The DMC receives a switch request of a user.

S802: If a to-be-switched-to media file is one of at least two media resources that have same media content, and a to-be-switched-to DMR does not support playback of the to-be-switched-to media resource, determine a media resource that is in the at least two media resources and whose playback is supported by the to-be-switched-to DMR.

S803: The DMC sends a playback command to the to-be-switched-to DMR.

The playback command carries metadata information of the media resource whose playback is supported by the to-be-switched-to DMR, so that the to-be-switched-to DMR plays the media file whose playback is supported.

Specifically, for example, when a media file "0" is being played on a DMR1 (Tablet), and the user intends to switch playback of the media content to a DMR3 (TV), the DMC invokes an AVT::GetPositionInfo( ) command to the DMR1, and acquires a current playback time point of the media file "0". Then, the DMC searches a match list to learn that a media file whose media file identification number is "2" is most suitable to be played on the DMR3, and then checks playback duration field information in metadata information of a media file corresponding to a media content directory of the media file "2", to discover that playback duration of the media file "2" is the same as that of the media file "0". The DMC invokes an AVT::SetAVTransportURI( ) command to the DMR3, where the command information includes URL address information, the related metadata information, and the acquired current media file playback time point that are of the media file "2", and the DMR3 requests, from a digital media server Cloud Server that stores the media file "2", a data stream that is of the media file "2" and starts after the current playback time point.

If the playback duration of the media file "2" is different from that of the media file "0", the DMC sequentially searches according to a priority sequence that is in a match list and of media files in a column of the DMR3 player, and if playback duration of each of the media files is different from the playback duration of the media file "0", when switching is being performed, the media file being played is not changed, and playback of the media file "0" is switched to the DMR3.

According to the media processing method in this embodiment, a DMC receives a switch request of a user, and sends, to a to-be-switched-to DMR, a playback command for a media file suitable to be played on the to-be-switched-to DMR; therefore, flexible selection of a playback device in a home area network is implemented, and a better playback effect can be obtained.

Figure 9:
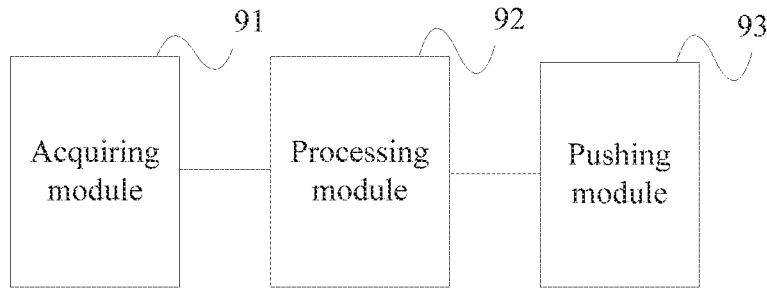
FIG. 9 is a schematic structural diagram of Embodiment 1 of a media control device according to the present invention.

FIG. 9 is a schematic structural diagram of Embodiment 1 of a media control device according to the present invention. As shown in FIG. 9, the apparatus in this embodiment may include an acquiring module 91, a processing module 92, and a pushing module 93. The acquiring module 91 is configured to: acquire a media content directory on at least one media server, and identify media description information in at least two media resource objects in the media content directory. The processing module 92 is configured to integrate the at least two media resource objects when media resources respectively corresponding to the at least two media resource objects have same media content, so that the integrated at least two media resource objects are represented by one media identifier. The pushing module 93 is configured to send, according to capability information of a media playback device selected by a user, a media resource address corresponding to a first media resource object to the media playback device, so that the media playback device acquires and plays a media resource corresponding to the media resource address, where the first media resource object is one of the at least two media resource objects that are suitable to be played on the media playback device.

The acquiring module 91 includes a match unit, configured to perform matching on at least one of a media title, duration, and film information that are in media description information in each media resource object, to determine whether at least two media resources that have same media content exist.

Optionally, the acquiring module 91 is specifically configured to: acquire an integrated media content directory sent by the at least one media server, and when a quantity of media servers is greater than or equal to two, identify media description information in at least two media resource objects that are in the integrated media content directory and belong to different media servers.

The match unit is specifically configured to: in the at least two media resource objects that are in the integrated media content directory and belong to the different media servers, perform matching on at least one of a media title, duration, and film information that are in media description information in each media resource object, to determine whether at least two media resources that have same media content exist.

Optionally, the performing matching on at least one of a media title, duration, and film information that are in media description information in each media resource object, to determine whether at least two media resources that have same media content exist may include: if any condition or any two conditions or three conditions in the following conditions (1), (2), and (3) is or are met, it may be determined that at least two media resources have same media content: (1) media titles in media description information corresponding to at least two media resources include a proportion of characters that are the same, where the proportion exceeds a first threshold; (2) a duration deviation in the media description information corresponding to the at least two media resources falls within a preset range; and (3) film information in the media description information corresponding to the at least two media resources is the same.

Optionally, the processing module further includes an integration unit, configured to: when the media resources respectively corresponding to the at least two media resource objects have same media content, mark each media resource object of the at least two media resource objects, where the marking is adding, to each media resource object of the at least two media resource objects, an identification number and address information that are of another media resource object of the at least two media resource objects, and the marked at least two media resource objects are represented by one media identifier; or when the media resources respectively corresponding to the at least two media resource objects have same media content, combine the at least two media resource objects to generate a reference media resource object, where the reference media resource object includes the media description information in each media resource object of the at least two media resource objects, and the at least two media resource objects are represented by a media identifier of the reference media resource object.

Optionally, the media control device further includes a playback match module, configured to: perform matching between each of the at least two media resource objects and playback capability information of each of at least one media playback device, and determine a media playback device that supports playback of media resources corresponding to all media resource objects in the at least two media resource objects.

The playback match module is specifically configured to: perform matching between a media format and resolution that are of each of the at least two media resource objects and a media format for which decoding is supported and display resolution that are in the device capability information of each of the at least one media playback device; or send a media data request message to the at least one media playback device, so that the at least one media playback device prefetches, according to the media data request message, at least a part of media resource data from the media server for a playback attempt.

Specifically, the media data request message includes a storage path of the media resources and a range of to-be-prefetched data.

Optionally, the pushing module 93 includes: a receiving unit, configured to receive a playback request of the user, where the playback request includes the media playback device selected from the at least one media playback device and a requested media identifier; a determining unit, determining the first media resource object if the requested media identifier is the media identifier corresponding to the at least two media resources that have same media content, where the first media resource object is a media resource that is in the at least two media resources and whose playback is supported by the selected media playback device; and a sending unit, configured to send a playback command to the selected media playback device, where the playback command carries the media resource address corresponding to the first media resource object, so that the selected media playback device plays the media resource whose playback is supported.

Optionally, the playback match module is specifically configured to: if a quantity of media resources that are in the at least two media resource objects and whose playback is supported by a media playback device is greater than one, determine, according to resolution of the more than one media resource and device capability information of the media playback device, a playback priority that is of the more than one media resource and relative to the media playback device; or if a quantity of media resources that are in the at least two media resource objects and whose playback is supported by a media playback device is greater than one, determine, according to a playback response delay effect of the more than one media resource, a playback priority that is of the more than one media resource and relative to the media playback device. The determining unit is specifically configured to determine a media resource that is in the at least two media resource objects, whose playback is supported by the selected media playback device, and that has a highest playback priority, where the playback command carries a media resource address of the media resource whose playback is supported by the selected media playback device and that has the highest playback priority.

Optionally, the media control device further includes a switch module, configured to: receive a switch request of the user, where the switch request includes identification numbers of a to-be-switched-to media playback device and a to-be-switched-to media resource; if the to-be-switched-to media resource is one of the at least two media resources that have same media content, and the to-be-switched-to media playback device does not support playback of the to-be-switched-to media resource, determine a media resource that is in the at least two media resources and whose playback is supported by the to-be-switched-to media playback device; and send a playback command to the to-be-switched-to media playback device, where the playback command carries a media resource address of the media resource whose playback is supported by the to-be-switched-to media playback device, so that the to-be-switched-to media playback device plays the media resource whose playback is supported.

The switch request further includes a current playback moment. The sending a playback command to the to-be-switched-to media playback device includes: if duration of the media resource that is in the at least two media resources and whose playback is supported by the to-be-switched-to media playback device is the same as duration of the to-be-switched-to media resource, sending the playback command to the to-be-switched-to media playback device, where the playback command further includes the current playback moment, so that the to-be-switched-to media playback device starts, from the current playback moment, to play the media resource whose playback is supported, where switching fails if the duration of the media resource that is in the at least two media resources and whose playback is supported by the to-be-switched-to media playback device is different from the duration of the to-be-switched-to media resource.

The media control device further includes a generation module, configured to generate a match list, where the match list includes an identifier of a media playback device and an identification number of a media resource that is in the at least two media resources and whose playback is supported by the media playback device. The determining unit is specifically configured to determine, according to the match list, an identification number of the media resource that is in the at least two media resources and whose playback is supported by the selected media playback device.

The media control device in this embodiment may be used to execute the technical solution in the method embodiment shown in FIG. 1, an implementation principle and a technical effect that are of this embodiment are similar to those of the method embodiment, and details are not described herein again.

Figure 10:
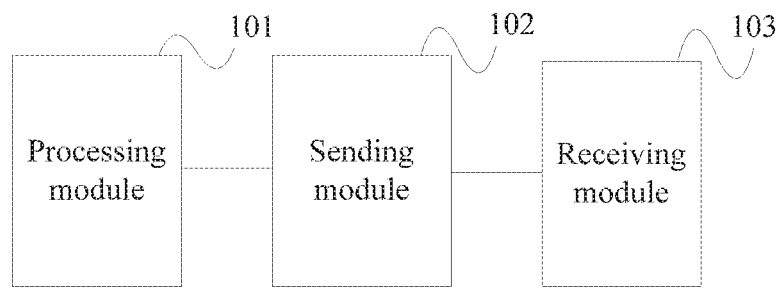
FIG. 10 is a schematic structural diagram of Embodiment 1 of a media server according to the present invention.

FIG. 10 is a schematic structural diagram of Embodiment 1 of a media server according to the present invention. As shown in FIG. 10, the apparatus in this embodiment may include a processing module 101, a sending module 102, and a receiving module 103. The processing module 101 is configured to: identify media description information in at least two media resource objects in a media content directory stored in the processing module, and integrate the at least two media resource objects when media resources respectively corresponding to the at least two media resource objects have same media content, so that the integrated at least two media resource objects are represented by one media identifier. The sending module 102 is configured to send an integrated media content directory to a media control device. The receiving module 103 is configured to: receive a media resource acquisition request sent by a media playback device, where the media resource acquisition request includes a media resource address; and send a media resource corresponding to the media resource address to the media playback device.

Optionally, the processing module 101 includes a match unit, configured to perform matching on at least one of a media title, duration, and film information that are in media description information in each media resource object, to determine whether at least two media resources that have same media content exist, where the film information may include publisher information and director information.

Specifically, the match unit is specifically configured to: if any condition or any two conditions or three conditions in the following conditions (1), (2), and (3) is or are met, may determine that at least two media resources have same media content: (1) media titles in media description information corresponding to at least two media resources include a proportion of characters that are the same, where the proportion exceeds a first threshold; (2) a duration deviation in the media description information corresponding to the at least two media resources falls within a preset range; and (3) film information in the media description information corresponding to the at least two media resources is the same.

Optionally, the processing module 101 is specifically configured to: when the media resources respectively corresponding to the at least two media resource objects have same media content, mark each media resource object of the at least two media resource objects, where the marking is adding, to each media resource object of the at least two media resource objects, an identification number and address information that are of another media resource object of the at least two media resource objects, and the marked at least two media resource objects are represented by one media identifier; or when the media resources respectively corresponding to the at least two media resource objects have same media content, combine the at least two media resource objects to generate a reference media resource object, where the reference media resource object includes the media description information in each media resource object of the at least two media resource objects, and the at least two media resource objects are represented by a media identifier of the reference media resource object.

The media control device in this embodiment may be used to execute the technical solution in the method embodiment shown in FIG. 5, an implementation principle and a technical effect that are of this embodiment are similar to those of the method embodiment, and details are not described herein again.

Figure 11:
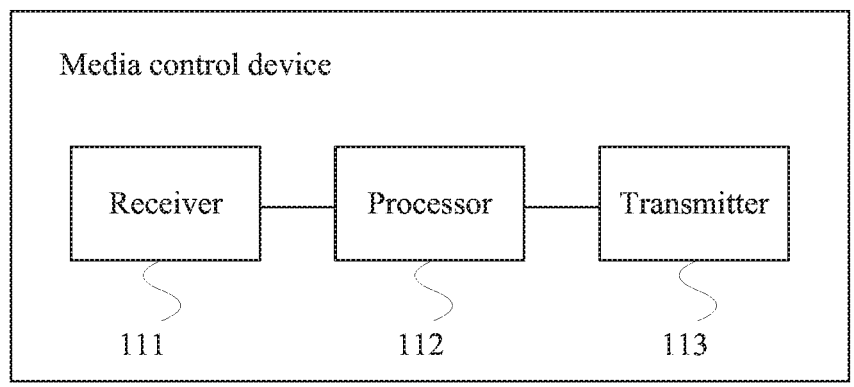
FIG. 11 is a schematic structural diagram of Embodiment 2 of a media control device according to the present invention.

FIG. 11 is a schematic structural diagram of Embodiment 2 of a media control device according to the present invention. As shown in FIG. 11, the device in this embodiment may include a receiver 111, a processor 112, and a transmitter 113. The receiver 111 is configured to: acquire a media content directory on at least one media server, and identify media description information in at least two media resource objects in the media content directory. The processor 112 is configured to integrate the at least two media resource objects when media resources respectively corresponding to the at least two media resource objects have same media content, so that the integrated at least two media resource objects are represented by one media identifier. The transmitter 113 is configured to send, according to capability information of a media playback device selected by a user, a media resource address corresponding to a first media resource object to the media playback device, so that the media playback device acquires and plays a media resource corresponding to the media resource address, where the first media resource object is one of the at least two media resource objects that are suitable to be played on the media playback device.

The receiver 111 is specifically configured to perform matching on at least one of a media title, duration, and film information that are in media description information in each media resource object, to determine whether at least two media resources that have same media content exist, where the film information may include publisher information and director information.

Optionally, the receiver 111 may be further configured to: acquire an integrated media content directory sent by the at least one media server, and when a quantity of media servers is greater than or equal to two, identify media description information in at least two media resource objects that are in the integrated media content directory and belong to different media servers. Specifically, in the at least two media resource objects that are in the integrated media content directory and belong to the different media servers, matching is performed on at least one of a media title, duration, and film information that are in media description information in each media resource object, to determine whether at least two media resources that have same media content exist, where the film information may include information such as publisher information and director information.

The performing matching on at least one of a media title, duration, and film information that are in media description information in each media resource object, to determine whether at least two media resources that have same media content exist includes: if any condition or any two conditions or three conditions in the following conditions (1), (2), and (3) is or are met, it may be determined that at least two media resources have same media content: (1) media titles in media description information corresponding to at least two media resources include a proportion of characters that are the same, where the proportion exceeds a first threshold; (2) a duration deviation in the media description information corresponding to the at least two media resources falls within a preset range; and (3) film information in the media description information corresponding to the at least two media resources is the same.

The processor 112 is specifically configured to: when the media resources respectively corresponding to the at least two media resource objects have same media content, mark each media resource object of the at least two media resource objects, where the marking is adding, to each media resource object of the at least two media resource objects, an identification number and address information that are of another media resource object of the at least two media resource objects, and the marked at least two media resource objects are represented by one media identifier; or when the media resources respectively corresponding to the at least two media resource objects have same media content, combine the at least two media resource objects to generate a reference media resource object, where the reference media resource object includes the media description information in each media resource object of the at least two media resource objects, and the at least two media resource objects are represented by a media identifier of the reference media resource object.

Optionally, before the sending, to a media playback device selected by a user and according to capability information of the media playback device, a media resource address corresponding to one media resource object of the at least two media resource objects suitable to be played on the media playback device, the following is further included: performing matching between each of the at least two media resource objects and playback capability information of each of at least one media playback device, and determining a media playback device that supports playback of media resources corresponding to all media resource objects in the at least two media resource objects.

Optionally, the performing matching between each of the at least two media resource objects and playback capability information of each of at least one media playback device includes: performing matching between a media format and resolution that are of each of the at least two media resource objects and a media format for which decoding is supported and display resolution that are in the device capability information of each of the at least one media playback device; or sending a media data request message to the at least one media playback device, so that the at least one media playback device prefetches, according to the media data request message, at least a part of media resource data from the media server for a playback attempt.

The media data request message includes a storage path of the media resources and a range of to-be-prefetched data.

Optionally, the transmitter 113 is specifically configured to: receive a playback request of the user, where the playback request includes the media playback device selected from the at least one media playback device and a requested media identifier; determine the first media resource object if the requested media identifier is the media identifier corresponding to the at least two media resources that have same media content, where the first media resource object is a media resource that is in the at least two media resources and whose playback is supported by the selected media playback device; and send a playback command to the selected media playback device, where the playback command carries the media resource address corresponding to the first media resource object, so that the selected media playback device plays the media resource whose playback is supported.

Optionally, the determining a media playback device that supports playback of media resources corresponding to all media resource objects in the at least two media resource objects includes: if a quantity of media resources that are in the at least two media resource objects and whose playback is supported by a media playback device is greater than one, determining, according to resolution of the more than one media resource and device capability information of the media playback device, a playback priority that is of the more than one media resource and relative to the media playback device; or if a quantity of media resources that are in the at least two media resource objects and whose playback is supported by a media playback device is greater than one, determining, according to a playback response delay effect of the more than one media resource, a playback priority that is of the more than one media resource and relative to the media playback device. The determining a media resource that is in the at least two media resources and whose playback is supported by the selected media playback device includes: determining a media resource that is in the at least two media resource objects, whose playback is supported by the selected media playback device, and that has a highest playback priority, where the playback command carries a media resource address of the media resource whose playback is supported by the selected media playback device and that has the highest playback priority.

Optionally, after the sending a playback command to the selected media playback device, the following is further included: receiving a switch request of the user, where the switch request includes identification numbers of a to-be-switched-to media playback device and a to-be-switched-to media resource; if the to-be-switched-to media resource is one of the at least two media resources that have same media content, and the to-be-switched-to media playback device does not support playback of the to-be-switched-to media resource, determining a media resource that is in the at least two media resources and whose playback is supported by the to-be-switched-to media playback device; and sending a playback command to the to-be-switched-to media playback device, where the playback command carries a media resource address of the media resource whose playback is supported by the to-be-switched-to media playback device, so that the to-be-switched-to media playback device plays the media resource whose playback is supported.

Optionally, the switch request further includes a current playback moment. The sending a playback command to the to-be-switched-to media playback device includes: if duration of the media resource that is in the at least two media resources and whose playback is supported by the to-be-switched-to media playback device is the same as duration of the to-be-switched-to media resource, sending the playback command to the to-be-switched-to media playback device, where the playback command further includes the current playback moment, so that the to-be-switched-to media playback device starts, from the current playback moment, to play the media resource whose playback is supported, where switching fails if the duration of the media resource that is in the at least two media resources and whose playback is supported by the to-be-switched-to media playback device is different from the duration of the to-be-switched-to media resource.

Optionally, after the determining a media playback device that supports playback of media resources corresponding to all media resource objects in the at least two media resource objects, the following is further included: generating a match list, where the match list includes an identifier of a media playback device and an identification number of a media resource that is in the at least two media resources and whose playback is supported by the media playback device. The determining a media resource that is in the at least two media resources and whose playback is supported by the selected media playback device includes: determining, according to the match list, an identification number of the media resource that is in the at least two media resources and whose playback is supported by the selected media playback device.

The media control device provided in this embodiment may be used to execute the technical solutions in the foregoing method embodiments, an implementation principle and a technical effect that are of this embodiment are similar to those of the foregoing method embodiments, and details are not described herein again.

Figure 12:
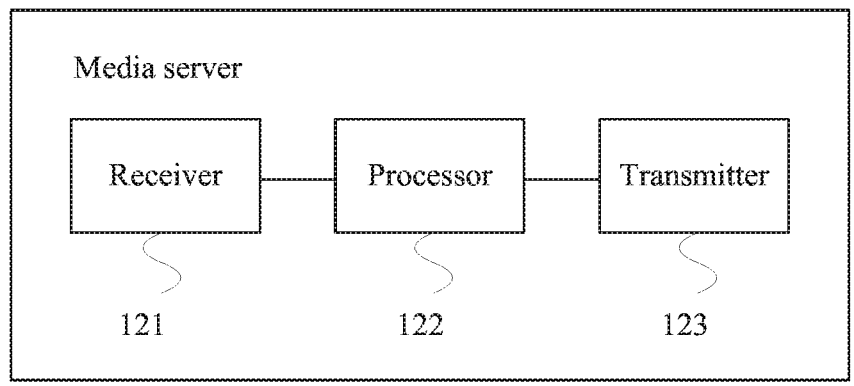
FIG. 12 is a schematic structural diagram of Embodiment 2 of a media server according to the present invention.

FIG. 12 is a schematic structural diagram of Embodiment 2 of a media server according to the present invention. As shown in FIG. 12, the device in this embodiment may include a processor 122, a transmitter 123, and a receiver 121. The processor 122 is configured to: identify media description information in at least two media resource objects in a media content directory stored in the processor 122, and integrate the at least two media resource objects when media resources respectively corresponding to the at least two media resource objects have same media content, so that the integrated at least two media resource objects are represented by one media identifier. The transmitter 123 is configured to send an integrated media content directory to a media control device. The receiver 121 is configured to: receive a media resource acquisition request sent by a media playback device, where the media resource acquisition request includes a media resource address; and send a media resource corresponding to the media resource address to the media playback device.

Optionally, the processor 121 is specifically configured to perform matching on at least one of a media title, duration, and film information that are in media description information in each media resource object, to determine whether at least two media resources that have same media content exist, where the film information includes publisher information and director information.

The performing matching on at least one of a media title, duration, and film information that are in media description information in each media resource object, to determine whether at least two media resources that have same media content exist includes: if any condition or any two conditions or three conditions in the following conditions (1), (2), and (3) is or are met, it may be determined that at least two media resources have same media content: (1) media titles in media description information corresponding to at least two media resources include a proportion of characters that are the same, where the proportion exceeds a first threshold; (2) a duration deviation in the media description information corresponding to the at least two media resources falls within a preset range; and (3) film information in the media description information corresponding to the at least two media resources is the same.

Optionally, the integrating the at least two media resource objects when media resources respectively corresponding to the at least two media resource objects have same media content, so that the integrated at least two media resource objects are represented by one media identifier includes: when the media resources respectively corresponding to the at least two media resource objects have same media content, marking each media resource object of the at least two media resource objects, where the marking is adding, to each media resource object of the at least two media resource objects, an identification number and address information that are of another media resource object of the at least two media resource objects, and the marked at least two media resource objects are represented by one media identifier; or when the media resources respectively corresponding to the at least two media resource objects have same media content, combining the at least two media resource objects to generate a reference media resource object, where the reference media resource object includes the media description information in each media resource object of the at least two media resource objects, and the at least two media resource objects are represented by a media identifier of the reference media resource object.

The media server provided in this embodiment may be used to execute the technical solutions in the foregoing method embodiments, an implementation principle and a technical effect that are of this embodiment are similar to those of the foregoing method embodiments, and details are not described herein again.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a read only memory (ROM), a random access memory random access memory (RAM), a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method, comprising:

acquiring a media content directory that resides on at least one media server and identifying media description information in at least two media resource objects in the media content directory;

integrating the at least two media resource objects in response to media resources corresponding to the at least two media resource objects having the same media content, so that the at least two integrated media resource objects are represented by one media identifier, wherein each media resource object of the at least two media resource objects has at least one of a media format or a resolution that is different from at least one other media resource object of the at least two media resource objects;

generating, according to the media content directory, a content list having media identifiers identifying media resources on the at least one media server, the media identifiers including the one media identifier, wherein the content list is free of duplicate media identifiers;

receiving, by a media control device, from each connected media playback device of a plurality of connected media playback devices connected to, and remote from, the media control device, capability information and supported media formats of the respective connected media playback device, wherein the capability information comprises a resolution and screen size of the respective connected media playback device, and wherein the supported media formats comprises a list of one or more media formats for which the respective connected media playback device supports decoding;

generating a match list according to the capability information and the supported media formats of each of the plurality of connected media playback devices, wherein the match list identification numbers of the media resources corresponding to the at least two media resource objects which are suitable to be played on each respective connected media playback device of the plurality of connected media playback devices;

determining that more than one of the media resources is supported by a media playback device of the plurality of connected media playback devices, and assigning a priority, according to at least one of a first priority assignment manner or a second priority assignment manner, to each of the more than one media resources supported by the media playback device, wherein the first priority assignment manner comprises assigning a priority to each of the more than one media resources according to a media resolution and a media encapsulation format of the respective more than one media resource with respect to a screen resolution and a media format playback capability of the media playback device, and wherein the second priority assignment manner comprises assigning a priority to each of the more than one media resources according to a playback response delay of playing the respective more than one media resource on the media playback device, resources is determined by the media playback device prefetching a portion of the more than one media resource, performing decoding, and attempting to perform playback; and sending, by the media control device, to the media playback device of the plurality of connected media playback devices selected by a user, a media resource address corresponding to a first media resource of the more than one media resources suitable to be played on the selected media playback device having a highest priority, represented by the one media identifier and selected from the content list, so that the selected media playback device acquires and plays the first media resource, wherein the first media resource corresponds to one of the at least two media resource objects.

2. The method according to 1, wherein identifying media description information in the at least two media resource objects in the media content directory comprises: performing matching on at least one of a media title, a duration, and film information in the media description information in each media resource object, to determine whether at least two media resources have the same media content.

3. The method according to claim 2, wherein performing matching on at least one of the media title, the duration, and the film information in the media description information in each media resource object, to determine whether the at least two media resource objects have the same media content comprises determining that the at least two media resource objects have same media content in response to matching one of the media title, the duration, and the file information;

determining that the at least two media resource objects have same media content in response to matching two of the media title, the duration, and the file information; and determining that the at least two media resource objects have same media content in response to matching three of the media title, the duration, and the file information; and wherein media titles in the media description information corresponding to the at least two media resource objects comprise a proportion of characters that are the same, wherein the proportion exceeds a first threshold;
wherein a duration deviation in the media description information corresponding to the at least two media resource objects falls within a preset range; and
wherein film information in the media description information corresponding to the at least two media resource objects is the same.

4. The method according to claim 1, wherein acquiring the media content directory on at least one media server and identifying media description information in the at least two media resource objects in the media content directory comprises:
acquiring an integrated media content directory sent by the at least one media server, the integrated media content directory comprising the media content directory residing on the at least one server, and further comprising a second media content directory residing on a second media server; and
identifying media description information in at least two media resource objects that are in the integrated media content directory and belong to different media servers.

5. The method according to claim 4, wherein identifying the media description information hi et least two media resource objects that are in the integrated media content directory and belong to different media servers comprises:
performing matching on at least one of a media title, a duration, and film information in media description information each media resource object, to determine whether at least two media resources have the same media content, in response to resource objects of the at least two media resources being in the integrated media content directory and belonging to the different media servers.

6. The method according to claim 1, wherein integrating the at least two media resource objects in response to the media resources corresponding to the at least two media resource objects have the same media content, so that the at least two integrated media resource objects are represented by one media identifier comprises:
marking each media resource object of the at least two media resource objects in response to the media resources corresponding to the at least two media resource objects having the same media content, wherein marking each media resource object comprises adding, to each media resource object of the at least two media resource objects, an identification number and address information of another media resource object of the at least two media resource objects, and wherein the at least two marked media resource objects are represented by the one media identifier; and
combining the at least two media resource objects to generate a reference media resource object in response to the media resources respectively corresponding to the at least two media resource objects having the same media content, wherein the reference media resource object comprises the media description information in each media resource object of the at least two media resource objects, and wherein the at least two media resource objects are represented by a media identifier of the reference media resource object.

7. The method according to claim 1, further comprising:
performing matching between each of the at least two media resource objects and the capability information and the supported media formats of each of at least one connected media playback device of the plurality of connected media playback devices, and determining a media playback device which supports playback of media resources corresponding to ail media resource objects in the at least two media resource objects, before the sending the media resource address corresponding to the first media resource to the selected media playback device.

8. The method according to claim 7, wherein the performing matching between each of the at least two media resource objects and the capability information and the supported media formats of each of the at least one connected media playback device comprises:
performing matching between a media format and resolution of each of the at least two media resource objects and a media format for which decoding is supported and display resolution in the capability information of each of the at least one connected media playback device.

9. A media control device, comprising:
a processor; and
a non-transitory computer readable storage medium storing a program for execution by the processor, the program including instructions to;
acquire a media content directory that resides on at least one media server and identify media description information in at least two media resource objects in the media content directory;
integrate the at least two media resource objects in response to media resources corresponding to the at least two media resource objects having the same media content, so that the at least two integrated media resource objects are represented by one media identifier, wherein each media resource object of the at least two media resource objects has at least one of a media format or a resolution that is different from at least one other media resource object of the at least two media resource objects;
generate, according to the media content directory, a content list having media identifiers identifying media resources on the at least one media server, the media identifiers including the one media identifier, wherein the content list is free of duplicate media identifiers; receive, from each connected media playback device of a plurality of connected media playback devices connected to, and remote from, the media control device, capability information and supported media formats of the respective connected media playback device, wherein the capability information comprises a resolution and screen size of the respective connected media playback device, and wherein the supported media formats comprises a list of one or more media formats for which the respective connected media playback device supports decoding;
generate a match list according to the capability information and the supported media formats of each of the plurality of connected media playback devices, wherein the match list comprises, for each of the plurality of connected media playback devices, identification numbers of the media resources corresponding to the at least two media resource objects which are suitable to be played on each respective connected media playback device of the plurality of connected media playback devices;
determining that more than one of the media resources is supported by a media playback device of the plurality of connected media playback devices, and assigning a priority, according to at least one of a first priority assignment manner or a second priority assignment manner, to each of the more than one media resources supported by the media playback device, wherein the first priority assignment manner comprises assigning a priority to each of the more than one media resources according to a media resolution and a media encapsulation format of the respective more than one media resource with respect to a screen resolution and a media format playback capability of the media playback device, and wherein the second priority assignment manner comprises assigning a priority to each of the more than one media resources according to a playback response delay of playing the respective more than one media resource on the media playback device, wherein the playback response delay for each of the more than one media resources is determined by the media playback device prefetching a portion of the more than one media resource, performing decoding, and attempting to perform playback; and send, to the media playback device of the plurality of connected media playback devices selected by a user, a media resource address corresponding to a first media resource of the more than one media resources suitable to be played on the selected media playback device having a highest priority, represented by the one media identifier and selected from the content list, so that the selected media playback device acquires and plays the first media resource wherein the first media resource corresponds to one of the at least two media resource objects.

10. The media control device according to claim 9, wherein the instructions further comprise instructions to perform matching on at least one of a media title, a duration, and film information in media description information in each of the at least two media resource objects, to determine whether the at least two media resource objects have a same media content.

11. The media control device according to claim 10, wherein the instructions to perform matching on at least one of the media title, the duration, and the film information in the media description information in each of the at least two media resource objects, to determine whether the at least two media resource objects have the same media content comprises instructions to:
determine that the at least two media resource objects have same media content in response to at least one of:
media titles in the media description information corresponding to the at least two media resource objects including a proportion of characters that are the same, wherein the proportion exceeds a first threshold;
a duration deviation in the media description information corresponding to the at least two media resource objects falling within a preset range; or
film information in the media description information corresponding to the at least two media resource objects being the same.

12. The media control device according to claim 9, wherein the instructions further comprise instructions to:
acquire an integrated media content directory sent by the at least one media server, the integrated media content directory comprising the media content directory residing on the at least one media server, and further comprising a second media content directory residing on a second media server; and identify media description information in at least two media resource objects in the integrated media content directory and belonging to different media servers.

13. The media control device according to claim 9, wherein the instructions further comprise instructions to:
mark each media resource object of the at least two media resource objects in response to the media resources corresponding to the at least two media resource objects having the same media content, wherein marking each media resource object comprises adding, to each media resource object of the at least two media resource objects, an identification number and address information of another media resource object of the at least two media resource objects, and wherein the at least two marked media resource objects are represented by the one media identifier; and
combine the at least two media resource objects to generate a reference media resource object in response to the media resources corresponding to the at least two media resource objects having the same media content, wherein the reference media resource object includes the media description information in each media resource object of the at least two media resource objects, and wherein the at least two media resource objects are represented by a media identifier of the reference media resource object.

14. The media control device according to claim 9, wherein the instructions further comprise instructions to:
receive a playback request of the user, wherein the playback request includes the selected media playback device and a requested media identifier;
determine the first media resource object in response to the requested media identifier being the one media identifier corresponding to the at least two media resource objects having the same media content, wherein the first media resource is a media resource in the at least two media resource objects and whose playback is supported by the selected media playback device; and
send a first playback command to the selected media playback device, wherein the first playback command carries the media resource address corresponding to the first media resource, so that the selected media playback device plays the first media resource whose playback is supported.

15. The media control device according to claim 14, wherein the instructions include instructions to:
receive a switch request of the user, wherein the switch request comprises identification numbers of a to-be-switched-to media playback device and a to-be-switched-to media resource, and further comprises a current playback moment; and
send a second playback command to the to-be-switched-to media playback device in response to a duration of the first media resource in the at least two media resource objects and whose playback is supported by the to-be-switched-to media playback device being the same as a duration of the to-be-switched-to media resource;
wherein the second playback command further includes the current playback moment, so that the to-be-switched-to media playback device starts, from the current playback moment, to play the to-be-switched-to media resource whose playback is supported; and
wherein switching fails in response to the duration of the first media resource object in the at least two media resource objects and whose playback is supported by the to-be-switched-to media playback device being different from the duration of the to media resource.

16. The media control device according to claim 9, wherein the instructions further comprise instructions to:
generate the match list after determining the selected media playback device that supports playback of media resources corresponding to one or more media resource objects in the at least two media resource objects, wherein the match list includes an identifier of a match list media playback device and an identification number of a media resource that is in the at least two media resource objects and whose playback is supported by the match list media playback device; and
determine, according to the match list and according to a priority of the media resource in the at least two media resource objects, an identification number of the media resource in the at least two media resource objects and whose playback is supported by the selected media playback device.

* * * * *

UNITED STATES PATENT AND TRADEMARK OFFICE
CERTIFICATE OF CORRECTION

PATENT NO. : 10,972,581 B2
APPLICATION NO. : 15/315317
DATED : April 6, 2021
INVENTOR(S) : Yunsheng Kuang Page 1 of 1

It is certified that error appears in the above-identified patent and that said Letters Patent is hereby corrected as shown below:

In the Claims

In Column 42, Lines 5-6, Claim 1, delete "wherein the match list identification numbers" and insert --wherein the match list comprises, for each of the plurality of connected media playback devices, identification numbers--.

In Column 42, Lines 28-29, Claim 1, delete "on the media playback device, resources is determined" and insert --on the media playback device, wherein the playback response delay for each of the more than one media resources is determined--.

In Column 43, Line 26, Claim 5, delete "hi et" and insert --in at--.

In Column 43, Line 31, Claim 5, delete "information each" and insert --information in each--.

In Column 44, Line 4, Claim 7, delete "ail" and insert --all--.

In Column 46, Line 32, Claim 14, delete "object".

In Column 46, Line 66, Claim 15, delete "object".

Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*